(12) United States Patent
Russell et al.

(10) Patent No.: US 7,665,452 B2
(45) Date of Patent: *Feb. 23, 2010

(54) FIRST AND SECOND SPARK PLUGS FOR IMPROVED COMBUSTION CONTROL

(75) Inventors: John D. Russell, Portland, OR (US);
Michael Andri, Portland, OR (US)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

This patent is subject to a terminal disclaimer.

(21) Appl. No.: 11/378,903

(22) Filed: Mar. 17, 2006

(65) Prior Publication Data

US 2007/0215102 A1   Sep. 20, 2007

(51) Int. Cl.
*F02P 15/08* (2006.01)
(52) U.S. Cl. .................................. 123/638; 123/431
(58) Field of Classification Search ........ 123/431, 123/305, 309–310, 406.31, 406.47, 406.55, 123/636, 638, 169 PB
See application file for complete search history.

(56) References Cited

U.S. PATENT DOCUMENTS

| | | | |
|---|---|---|---|
| 2,221,405 A | 11/1940 | Nalinger | |
| 3,589,348 A | 6/1971 | Reichhelm | |
| 3,794,000 A | 2/1974 | Hodgkinson | |
| 4,031,864 A | 6/1977 | Crothers | |
| 4,136,652 A | 1/1979 | Lee | |
| 4,205,650 A | 6/1980 | Szwarcbier | |
| 4,256,075 A | 3/1981 | Fukui et al. | |
| 4,311,118 A | 1/1982 | Slagle | |
| 4,325,329 A | 4/1982 | Taylor | |
| 4,331,121 A | 5/1982 | Stokes | |
| 4,402,296 A | 9/1983 | Schwarz | |
| 4,411,243 A | 10/1983 | Hardenberg et al. | |
| 4,459,930 A | 7/1984 | Flory | |
| 4,480,616 A | 11/1984 | Takeda | |
| 4,489,596 A | 12/1984 | Linder et al. | |

(Continued)

FOREIGN PATENT DOCUMENTS

EP          1057988         1/2006

(Continued)

OTHER PUBLICATIONS

Stephen Russ, "A Review of the Effect of Engine Operating Conditions on Borderline Knock", SAE Technical Paper Series 960497, Feb. 26-29, 1996.

(Continued)

*Primary Examiner*—Hai H Huynh
(74) *Attorney, Agent, or Firm*—Allan J. Lippa; Alleman Hall McCoy Russell & Tuttle LLP

(57) ABSTRACT

An engine system, comprising of a combustion chamber; a first spark plug configured to perform a spark within the combustion chamber, said first plug configured to have a first heat range; a second spark plug configured to produce a spark within the combustion chamber, said second plug configured to have a second heat range different from said first heat range of said first plug; and a delivery system configured to deliver a hydrocarbon fuel and a fluid including an alcohol to the combustion chamber in varying resulting ratios.

20 Claims, 16 Drawing Sheets

U.S. PATENT DOCUMENTS

| | | | |
|---|---|---|---|
| 4,502,453 A | 3/1985 | Kabasin et al. |
| 4,590,904 A | 5/1986 | Wannenwetsch |
| 4,648,367 A | 3/1987 | Gillbrand et al. |
| 4,706,630 A | 11/1987 | Wineland et al. |
| 4,810,929 A | 3/1989 | Strumbos |
| 4,817,576 A | 4/1989 | Abe et al. |
| 4,930,537 A | 6/1990 | Farmer |
| 4,945,881 A | 8/1990 | Gonze et al. |
| 4,962,789 A | 10/1990 | Benscoter |
| 4,993,386 A | 2/1991 | Ozasa et al. |
| 4,998,518 A | 3/1991 | Mitsumoto |
| 5,017,826 A | 5/1991 | Oshima et al. |
| 5,018,483 A | 5/1991 | Kashima et al. |
| 5,044,331 A | 9/1991 | Suga et al. |
| 5,044,344 A | 9/1991 | Tuckey et al. |
| 5,056,490 A | 10/1991 | Kashima |
| 5,056,494 A | 10/1991 | Kayanuma |
| 5,060,610 A | 10/1991 | Paro |
| 5,111,795 A | 5/1992 | Thompson |
| 5,131,228 A | 7/1992 | Mochizuki et al. |
| 5,188,087 A | 2/1993 | Saito |
| 5,204,630 A | 4/1993 | Seitz et al. |
| 5,230,309 A | 7/1993 | Suga et al. |
| 5,233,944 A | 8/1993 | Mochizuki |
| 5,335,637 A | 8/1994 | Davis et al. |
| 5,336,396 A | 8/1994 | Shetley |
| 5,357,908 A | 10/1994 | Sung et al. |
| 5,360,034 A | 11/1994 | Der Manuelian |
| 5,408,979 A | 4/1995 | Backlund et al. |
| 5,417,239 A | 5/1995 | Ford |
| 5,469,830 A | 11/1995 | Gonzalez |
| 5,477,836 A | 12/1995 | Hyodo et al. |
| 5,508,582 A | 4/1996 | Sugimoto et al. |
| 5,565,157 A | 10/1996 | Sugimoto et al. |
| 5,694,908 A | 12/1997 | Hsu |
| 5,740,784 A | 4/1998 | McKinney |
| 5,782,092 A | 7/1998 | Schultalbers et al. |
| 5,806,500 A | 9/1998 | Fargo et al. |
| 5,875,743 A | 3/1999 | Dickey |
| 5,878,566 A | 3/1999 | Endo et al. |
| 5,921,222 A | 7/1999 | Freeland |
| 6,112,705 A | 9/2000 | Nakayama et al. |
| 6,112,725 A | 9/2000 | McKinney |
| 6,119,637 A | 9/2000 | Matthews et al. |
| 6,189,516 B1 | 2/2001 | Hei Ma |
| 6,213,086 B1 | 4/2001 | Chmela et al. |
| 6,229,253 B1 | 5/2001 | Iwata et al. |
| 6,234,123 B1 | 5/2001 | Iiyama et al. |
| 6,318,083 B1 | 11/2001 | Machida et al. |
| 6,325,039 B1 | 12/2001 | Goto |
| 6,382,225 B1 | 5/2002 | Tipton |
| 6,494,192 B1 | 12/2002 | Capshaw et al. |
| 6,505,579 B1 | 1/2003 | Lee |
| 6,536,406 B2 * | 3/2003 | Matsubara et al. .......... 123/310 |
| 6,553,974 B1 | 4/2003 | Wickman et al. |
| 6,617,769 B2 | 9/2003 | Suzuki |
| 6,619,242 B2 | 9/2003 | Kaneko |
| 6,622,664 B2 | 9/2003 | Holder et al. |
| 6,622,690 B2 | 9/2003 | Ando et al. |
| 6,651,432 B1 | 11/2003 | Gray, Jr. |
| 6,659,068 B2 | 12/2003 | Urushihara et al. |
| 6,691,669 B2 | 2/2004 | Surnilla et al. |
| 6,698,387 B1 | 3/2004 | McFarland et al. |
| 6,711,893 B2 | 3/2004 | Ueda et al. |
| 6,792,966 B2 | 9/2004 | Harvey |
| 6,845,616 B2 | 1/2005 | Jauss |
| 6,928,983 B2 | 8/2005 | Mashiki |
| 6,951,202 B2 | 10/2005 | Oda |
| 6,959,693 B2 | 11/2005 | Oda |
| 6,972,093 B2 | 12/2005 | Partridge et al. |
| 6,978,762 B2 | 12/2005 | Mori |
| 6,988,485 B2 | 1/2006 | Ichise et al. |
| 6,990,956 B2 | 1/2006 | Niimi |
| 7,055,500 B2 | 6/2006 | Miyashita et al. |
| 7,082,926 B2 | 8/2006 | Sadakane et al. |
| 7,159,568 B1 | 1/2007 | Lewis et al. |
| 7,178,503 B1 | 2/2007 | Brehob |
| 7,225,787 B2 | 6/2007 | Bromberg et al. |
| 7,255,080 B1 | 8/2007 | Leone |
| 7,261,064 B2 | 8/2007 | Bhaisora et al. |
| 7,278,396 B2 | 10/2007 | Leone et al. |
| 7,287,492 B2 | 10/2007 | Leone et al. |
| 7,287,509 B1 | 10/2007 | Brehob |
| 7,293,552 B2 | 11/2007 | Leone et al. |
| 7,475,669 B2 * | 1/2009 | Maeda ....................... 123/310 |
| 2001/0035215 A1 | 11/2001 | Tipton et al. |
| 2003/0089337 A1 | 5/2003 | Cohn et al. |
| 2003/0127072 A1 | 7/2003 | Gmelin et al. |
| 2003/0221660 A1 | 12/2003 | Surnilla et al. |
| 2004/0035395 A1 | 2/2004 | Heywood et al. |
| 2004/0065274 A1 | 4/2004 | Cohn et al. |
| 2004/0083717 A1 | 5/2004 | Zhu et al. |
| 2004/0250790 A1 | 12/2004 | Heywood et al. |
| 2004/0261763 A1 | 12/2004 | Hashimoto et al. |
| 2005/0051135 A1 | 3/2005 | Tomoda et al. |
| 2005/0066939 A1 | 3/2005 | Shimada et al. |
| 2005/0097888 A1 | 5/2005 | Miyashita |
| 2005/0103285 A1 | 5/2005 | Oda |
| 2005/0109316 A1 | 5/2005 | Oda |
| 2005/0109319 A1 | 5/2005 | Oda |
| 2005/0155577 A1 | 7/2005 | Ichise et al. |
| 2005/0155578 A1 | 7/2005 | Ichise et al. |
| 2005/0166896 A1 | 8/2005 | Sadakane |
| 2005/0172931 A1 | 8/2005 | Mori |
| 2005/0178356 A1 | 8/2005 | Shibagaki |
| 2005/0178360 A1 | 8/2005 | Satou |
| 2005/0183698 A1 | 8/2005 | Yonezawa |
| 2005/0274353 A1 | 12/2005 | Okubo et al. |
| 2006/0016429 A1 | 1/2006 | Mashiki |
| 2006/0075991 A1 | 4/2006 | Heywood et al. |
| 2006/0090732 A1 | 5/2006 | Shibagaki |
| 2006/0102136 A1 | 5/2006 | Bromberg et al. |
| 2006/0102145 A1 | 5/2006 | Cohn et al. |
| 2006/0102146 A1 | 5/2006 | Cohn et al. |
| 2006/0180099 A1 | 8/2006 | Aimoto et al. |
| 2006/0191727 A1 | 8/2006 | Usami et al. |
| 2007/0028861 A1 | 2/2007 | Kamio et al. |
| 2007/0028905 A1 | 2/2007 | Shinagawa et al. |
| 2007/0034192 A1 | 2/2007 | Kamio et al. |
| 2007/0119391 A1 | 5/2007 | Fried et al. |
| 2007/0119392 A1 | 5/2007 | Leone et al. |
| 2007/0119394 A1 | 5/2007 | Leone |
| 2007/0119411 A1 | 5/2007 | Kerns |
| 2007/0119412 A1 | 5/2007 | Leone et al. |
| 2007/0119413 A1 | 5/2007 | Lewis et al. |
| 2007/0119414 A1 | 5/2007 | Leone et al. |
| 2007/0119415 A1 | 5/2007 | Lewis et al. |
| 2007/0119416 A1 | 5/2007 | Boyarski |
| 2007/0119421 A1 | 5/2007 | Lewis et al. |
| 2007/0119422 A1 | 5/2007 | Lewis et al. |
| 2007/0119425 A1 | 5/2007 | Lewis et al. |
| 2007/0204813 A1 | 9/2007 | Arai et al. |
| 2007/0215069 A1 | 9/2007 | Leone |
| 2007/0215071 A1 | 9/2007 | Dearth et al. |
| 2007/0215072 A1 | 9/2007 | Dearth et al. |
| 2007/0215101 A1 | 9/2007 | Russell et al. |
| 2007/0215104 A1 | 9/2007 | Hahn |
| 2007/0215110 A1 | 9/2007 | Stein et al. |
| 2007/0215111 A1 | 9/2007 | Surnilla |
| 2007/0215125 A1 | 9/2007 | Dearth et al. |
| 2007/0215127 A1 | 9/2007 | Dearth et al. |
| 2007/0215130 A1 | 9/2007 | Shelby et al. |
| 2007/0219674 A1 | 9/2007 | Leone |
| 2007/0219701 A1 | 9/2007 | Hashimoto et al. |

| | | |
|---|---|---|
| 2007/0221163 A1 | 9/2007 | Kamio |
| 2007/0234976 A1 | 10/2007 | Dearth et al. |

FOREIGN PATENT DOCUMENTS

| | | |
|---|---|---|
| JP | 61065066 | 9/1984 |
| JP | 2007/056754 | 3/2007 |
| WO | WO 2004/097198 | 11/2004 |
| WO | WO 2006/055540 | 5/2006 |
| WO | WO 2007/106354 | 9/2007 |
| WO | WO 2007/106416 | 9/2007 |

OTHER PUBLICATIONS

S. Brusca et al., "Water Injection in IC-SI Engines to Control Detonation and to Reduce Pollutant Emissions", SAE Technical Paper No. 2003-01-1912, May 19-22, 2003.

D.R. Cohn et al., "Direct Injection Ethanol Boosted Gasoline Engines: Biofuel Leveraging for Cost Effective Reduction of Oil Dependence and CO2 Emissions", Mar. 15, 2005, Massachusetts Institute of Technology.

L. Bromberg et al., "Calculations of Knock Suppression in Highly Turbocharged Gasoline/Ethanol Engines Using Direct Ethanol Injection", Jul. 7, 2005, Massachusetts Institute of Technology.

Zhu et al., "MBT Timing Detection and its Closed-Loop Control Using In-Cylinder Ionization Signal", SAE Technical Paper Series No. 2004-01-2976, Oct. 25-28, 2004.

U.S. Appl. No. 12/014,952, filed Jan. 16, 2008, Leone et al.
U.S. Appl. No. 60/780,319, filed Mar. 8, 2006, Bromberg et al.
U.S. Appl. No. 11/682,372, filed Mar. 6, 2007, Bromberg et al.
U.S. Appl. No. 11/782,050, filed Jul. 24, 2007, Bromberg et al.
U.S. Appl. No. 60/781,598, filed Mar. 10, 2006, Blumberg et al.
U.S. Appl. No. 11/683,564, filed Mar. 8, 2007, Bromberg et al.
U.S. Appl. No. 60/780,981, filed Mar. 10, 2006, Cohn et al.
U.S. Appl. No. 11/684,100, filed Mar. 9, 2007, Cohn et al.
U.S. Appl. No. 60/790,715, filed Apr. 10, 2006, Bromberg et al.
U.S. Appl. No. 60/746,507, filed May 5, 2006, Cohn et al.
U.S. Appl. No. 60/747,865, filed May 22, 2006, Heywood et al.
U.S. Appl. No. 60/832,836, filed Jul. 24, 2006, Bromberg et al.
U.S. Appl. No. 11/948,753, filed Jul. 10, 2007, Bromberg et al.
U.S. Appl. No. 60/973,499, filed Sep. 19, 2007, Bromberg et al.
U.S. Appl. No. 11/962,683, filed Dec. 21, 2007, Prusifull et al.
U.S. Appl. No. 11/871,496, filed Oct. 12, 2007, Zubeck et al.
U.S. Appl. No. 11/955,246, filed Dec. 12, 2007, Pursifull et al.
U.S. Appl. No. 11/566,131, filed Dec. 1, 2006, Blumberg et al.
U.S. Appl. No. 11/776,120, filed Jul. 11, 2007, Stein et al.
U.S. Appl. No. 11/846,373, filed Aug. 25, 2007, Leone et al.
U.S. Appl. No. 11/851,116, filed Sep. 6, 2007, Kerns.
U.S. Appl. No. 11/923,418, filed Oct. 24, 2007, Leone et al.
U.S. Appl. No. 11/924,395, filed Oct. 25, 2007, Brehob.
U.S. Appl. No. 11/464,172, filed Aug. 11, 2006, Stein.

Hunter, M. Park, "1962 Oldsmobile Jetfire," originally appeared in Special Interest Autos, Apr. 1996, http://www.tctc.com/~park/mph/pageCLIP/page62JET/62jet.htm, Nov. 7, 2006.

Vance, Bill, "Turbocharger Boosted Engine's Efficiency: Developed to maintain high-altitude performance," for the Calgary Herald Edmonton, http://www.ucalgary.ca/~csimpson/Articles/JetFire.html, Nov. 7, 2006.

* cited by examiner

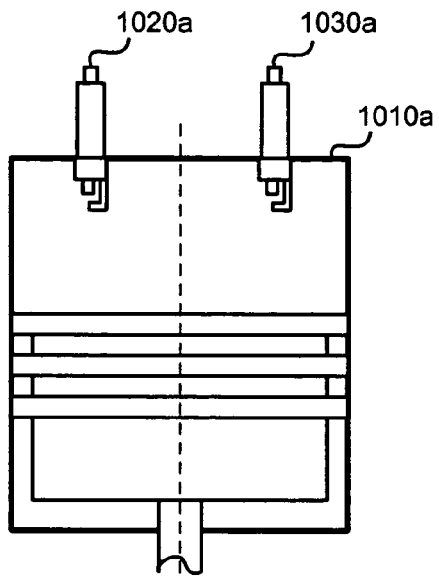
FIG. 10A
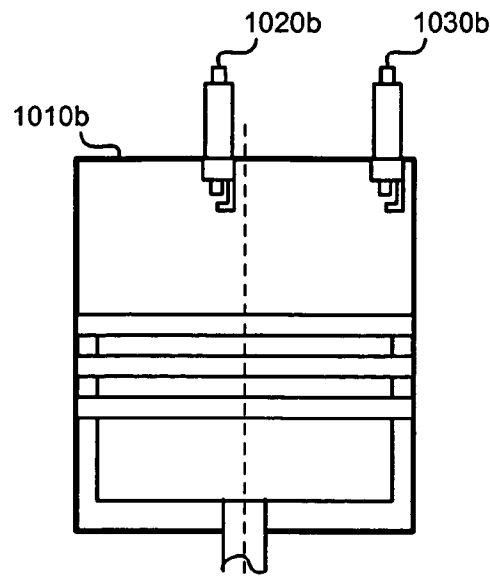
FIG. 10B
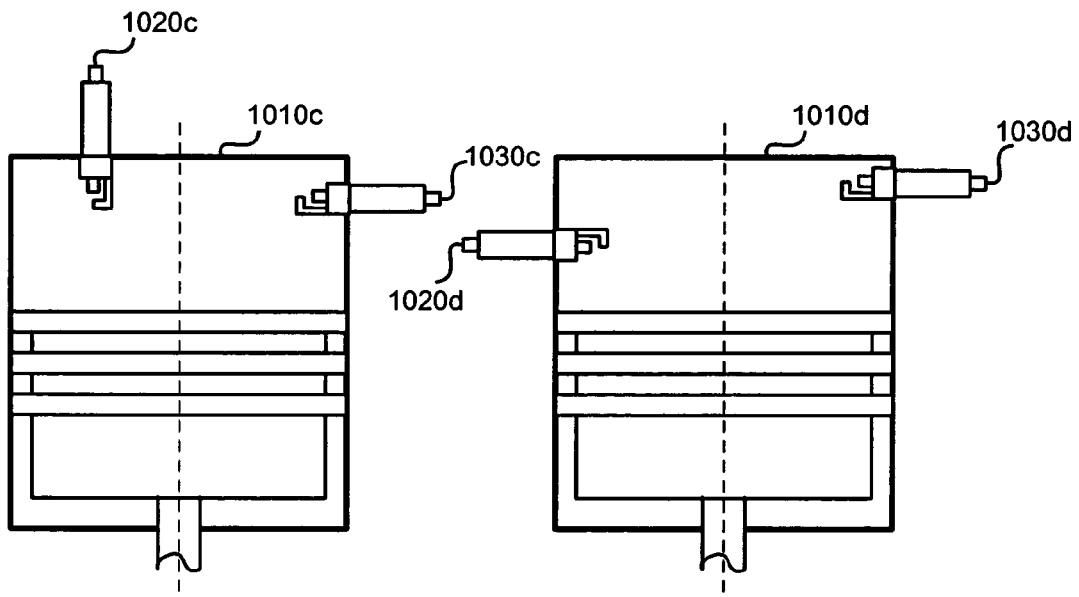
FIG. 10C
FIG. 10D

FIRST AND SECOND SPARK PLUGS FOR IMPROVED COMBUSTION CONTROL

BACKGROUND AND SUMMARY

Engines may use various forms of fuel delivery to provide a desired amount of fuel for combustion in each cylinder. One type of fuel delivery uses a port injector for each cylinder to deliver fuel to respective cylinders. Still another type of fuel delivery uses a direct injector for each cylinder.

Further, engines have been proposed using more than one type of fuel injection. For example, the papers titled "Calculations of Knock Suppression in Highly Turbocharged Gasoline/Ethanol Engines Using Direct Ethanol Injection" and "Direct Injection Ethanol Boosted Gasoline Engine Biofuel Leveraging for Cost Effective Reduction of Oil Dependence and CO2 Emissions" by Heywood et al. are one example. Specifically, the Heywood et al. papers describes directly injecting ethanol to improve charge cooling effects, while relying on port injected gasoline for providing the majority of combusted fuel over a drive cycle. The ethanol provides increased charge cooling due to its increased heat of vaporization compared with gasoline, thereby reducing knock limits on boosting and/or compression ratio. Further, water may be included in the mixture. The above approaches purport to improved engine fuel economy and increase utilization of renewable fuels.

However, the inventors herein have recognized a disadvantage with such an approach when the engine combustion chamber may receive varying ratio of fuel types. For example, under conditions where knock limits on spark advance are not restrictive, the cylinders may operate with a lower alcohol amount, whereas under conditions where knock limits on spark advance may cause fuel economy losses, the cylinders may operate with a higher alcohol amount to suppress knock and reduce limits on spark advance. In such cases, a higher temperature spark plug design may cause pre-ignition during the conditions of increased alcohol. Alternatively, a lower temperature spark plug design may cause spark plug fouling during the conditions of decreased alcohol.

In other words, the selection of spark plug heat range is a trade-off between the risk of preignition at high loads and the risk of spark plug carbon fouling at light loads. The proposed combination of ethanol at high loads and gasoline at low loads, for example, makes this trade-off much more difficult, because ethanol is more prone to preignition than gasoline, and gasoline is more prone to spark plug carbon fouling than ethanol.

As such, the inventors herein have recognized an approach to address the above competing spark plug requirements. The approach may include an engine system, comprising a combustion chamber; a first spark plug configured to perform a spark within the combustion chamber, said first plug configured to have a first heat range; a second spark plug configured to produce a spark within the combustion chamber; said second plug configured to have a second heat range different from said first heat range of said first plug; and a delivery system configured to deliver a hydrocarbon fuel and a fluid including an alcohol to the combustion chamber in varying resulting ratios.

By using spark plugs with different heat ranges or configurations, the combustion chamber system can accommodate different fuel/alcohol ratios, while also addressing pre-ignition and spark plug fouling. Thus, the engine control system can select the appropriate spark plug or spark plugs for the operating conditions and fuel delivery strategy, thereby improving engine performance and efficiency, under some conditions.

DESCRIPTION OF THE DRAWING

FIGS. 10A-10D show several schematic diagrams of example combustion chamber configurations.

DETAILED DESCRIPTION

Figure 1:
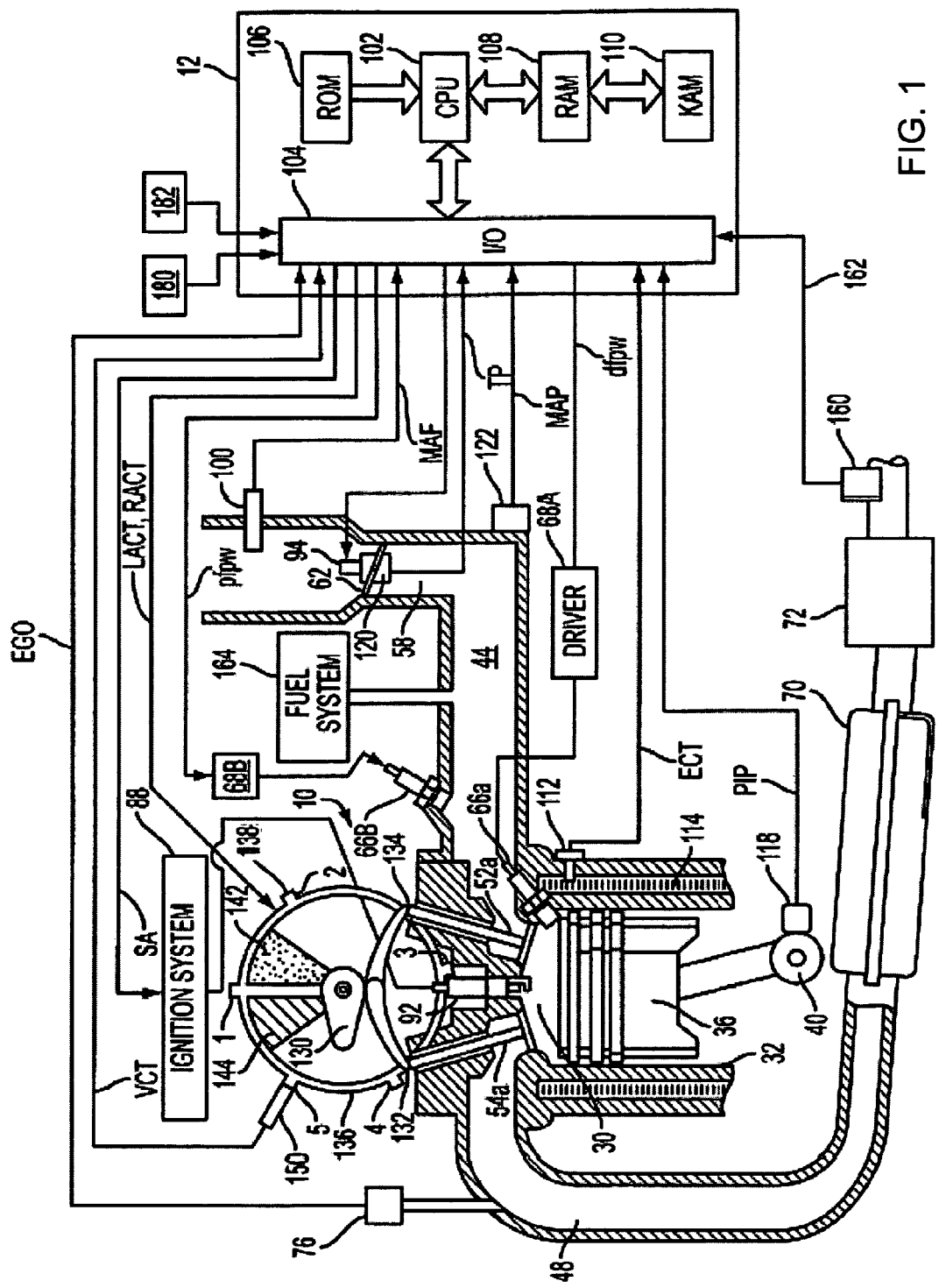
FIG. 1 shows a schematic diagram of an example engine.

FIG. 1 shows one cylinder of a multi-cylinder engine, as well as the intake and exhaust path connected to that cylinder. In the embodiment shown in FIG. 1, engine 10 is capable of using two different fuels types, and/or two different injection types. For example, engine 10 may use a hydrocarbon fuel such as gasoline and another substance such as a fluid including an alcohol such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gasoline), a mixture of an alcohol and water, a mixture of an alcohol, water, and gasoline, etc. As described herein a "substance" may include a liquid or fluid, gas or vapor, solid, or combinations thereof. In some embodiments, a single injector (such as a direct injector) may be used to inject a mixture of two or more fuel and/or fluid types (e.g., gasoline and/or ethanol, methanol, water). The resulting ratio of the two substances (i.e. fuel and/or fluid) in the mixture delivered may be varied during engine operation via adjustments made by controller 12 via a mixing valve, for example. In some embodiments, two different injectors can be used for each cylinder used, such as port and direct injectors. In some embodiments, different size and/or spray pattern injectors may be used, instead of, or in addition to, different locations and different fuels.

As will be described in more detail below, various advantageous results may be obtained by at least some of the above systems. For example, when using both gasoline and a fuel having alcohol (e.g., ethanol), it may be possible to adjust the relative amounts of the fuels to take advantage of the increased charge cooling of alcohol fuels (e.g., via direct injection) to reduce the tendency of knock. This phenomenon, combined with increased compression ratio, and/or boosting and/or engine downsizing, can then be used to obtain large fuel economy benefits (by reducing the knock limitations on the engine). However, when combusting a mixture having alcohol, the likelihood of preignition may be increased under some operating conditions.

As used herein, an "injection type" or "type of injection" may refer to different injection locations, different compositions of substances being injected (e.g., water, gasoline, alcohol), different fuel blends being injected, different alcohol contents being injected (e.g., 0% vs. 85%), etc.

Returning to FIG. 1, a delivery system configured to deliver a fuel and/or a substance such as a knock suppressant fluid is shown with two injectors per cylinder. An engine can be constructed with two or more injectors for each cylinder of the engine, for only one cylinder of the engine, or for more than one but less than all cylinders of the engine. The two injectors may be configured in various locations, such as two port injectors, one port injector and one direct injector (as shown in FIG. 1), two direct injectors, or others. In some embodiments, engine 10 may have only one injector and may only inject one type of fuel and/or fluid. Also, various configurations of the cylinders, injectors, and exhaust system, as well as various configurations for the fuel vapor purging system and exhaust gas oxygen sensor locations, are possible.

Internal combustion engine 10 is controlled by a control system, which may include one or more controllers such as electronic engine controller 12. Cylinder or combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used. In one particular example, piston 36 may include a recess or bowl (not shown) to help in forming stratified charges of air and fuel, if desired. However, a flat piston may be used.

Combustion chamber, or cylinder, 30 is shown communicating with intake manifold 44 and exhaust manifold 48 via respective intake valves 52a (only one of which is shown), and exhaust valves 54a (only one of which is shown). Thus, while four valves per cylinder may be used, in some embodiments, a single intake and single exhaust valve per cylinder may also be used or two intake valves and one exhaust valve per cylinder may be used. One characteristic of a combustion chamber 30 is its compression ratio, which is the ratio of the volume when piston 36 is at bottom center to the ratio of the volume when the piston is at top center. In one example, the compression ratio may be approximately 9:1, although this is not required. In some embodiments, the compression ratio may be a different value, such as between 10:1 and 11:1 or 11:1 and 12:1, or greater.

FIG. 1 shows a multiple injection system, where engine 10 has both direct and port injection, as well as spark ignition. However, in some embodiments, the cylinder may include only one injector for directly injecting a fuel and/or a fluid into the combustion chamber or one injector for injecting a fuel and/or a fluid upstream of the combustion chamber. Injector 66A is shown directly coupled to combustion chamber 30 for delivering injected fuel and/or fluid directly therein in proportion to the pulse width of signal dfpw received from controller 12 via electronic driver 68. While FIG. 1 shows injector 66A as a side injector, it may also be located overhead of the piston, such as near the position of spark plug 92. Such a position may improve mixing and combustion due to the lower volatility of some alcohol based fuels. The injector may also be located overhead and near the intake valve to improve mixing.

Fuel and/or fluid may be delivered to injector 66A by a high pressure delivery system (not shown) including a fuel and/or fluid tank, pumps, and a fuel and/or fluid rail. Alternatively, fuel and/or fluid may be delivered by a single stage pump at lower pressure. Further, while not shown, the fuel and/or fluid tank (or tanks) may (each) have a pressure transducer providing a signal to the control system.

Injector 66B is shown coupled to intake manifold 44, rather than directly to cylinder 30. Injector 66B delivers injected fuel in proportion to the pulse width of signal pfpw received from controller 12 via electronic driver 68. Note that a single driver 68 may be used for both injectors, or multiple drivers may be used. Fuel system 164 is also shown in schematic form delivering vapors to intake manifold 44. Various fuel systems and fuel vapor purge systems may be used.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration may be referred to as electronic throttle control (ETC), which can also be utilized during idle speed control. In some embodiments (not shown), a bypass air passageway can be arranged in parallel with throttle plate 62 to control inducted airflow during idle speed control via an idle control by-pass valve positioned within the air passageway.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio, such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used during feedback air/fuel control to maintain average air/fuel at stoichiometry during a stoichiometric homogeneous mode of operation.

Emission control device 72 is shown positioned downstream of catalytic converter 70. Emission control device 72 may be a three-way catalyst or a NOx trap, or combinations thereof. Sensor 160 may provide an indication of oxygen concentration in the exhaust gas via signal 162, which provides controller 12 a voltage indicative of the $O_2$ concentration. For example, sensor 160 can be a HEGO, UEGO, EGO, or other type of exhaust gas sensor. Also note that, as described above with regard to sensor 76, sensor 160 can correspond to various different sensors.

Ignition system 88 including one or more spark plugs, can provide a spark to combustion chamber 30, for example, via spark plug 92 in response to spark advance signal SA from controller 12. In some embodiments, spark plug 92 can be configured to receive a voltage generated by an ignition coil contained within ignition system 88. An electric current may be supplied from ignition system 88 to achieve a voltage difference between a center electrode and a side electrode of the spark plug, as will be shown in greater detail below with reference to 3A. At low voltages, current may be restricted from flowing between the center and side electrodes by the air gap, but as voltage is increased, the gases in the vicinity of the spark plug begin to change. Once the voltage across the spark plug (i.e., between the center and side electrodes, also referred to as the spark gap) exceeds the dielectric strength of the gases, the gases may become ionized. An ionized gas may then become a conductor, allowing current to flow across the spark gap. The flow of current across the spark gap causes a temperature increase in the vicinity of the spark plug, initiating combustion of the air and fuel mixture.

The control system may be configured to control the ignition system so that a single ignition spark is performed by the spark plug to initiate combustion of a fuel and/or fluid mixture within the combustion chamber. In some embodiments, the control system may be configured to control spark plug 92 so that multiple sparks are performed. For example, multiple sparks may be used to ensure complete combustion of the fluid and fuel mixture and/or to increase the temperature of the spark plug.

In some conditions, the control system may use one or more strategies to increase the temperature of the spark plug. For example, multiple sparks may be used. In some embodiments, the spark plug may be configured with a heating system for increasing the temperature of the spark plug. By increasing the temperature of the spark plug, fouling and/or misfire may be reduced, under some conditions.

In some embodiments, the control system may use feedback from a variety of sensors to control engine operation. One example is ionization sensing or ion sensing, which may be achieved by applying a voltage across the spark plug. The current or resistance detected responsive to the applied voltage can be indicative of the creation of ions or ionization, including their relative concentration and recombination, the pressure within the combustion chamber, and the temperature of the combustion chamber and/or spark plug, among others. In some embodiments, ion sensing may be used only when the spark plug is not performing a spark. However, in some embodiments, ion sensing may be used at any time, even during a sparking operation.

In one example, ion sensing may be used to detect knock within the combustion chamber. For example, knock may cause a pressure oscillation in the cylinder with a frequency defined at least partially by the geometry of the combustion chamber. This oscillation may be present in the detected current responsive to the applied ion sensing voltage. In some embodiments, ion sensing may be used to detect misfire within the combustion chamber. For example, misfire may result in low or no production of ions and hence when there is a misfire, there may be a corresponding low or no current detected. Further, ion sensing may be used to detect preignition and/or a preignition condition (i.e. a condition approaching preignition) of the fuel and/or fluid within the combustion chamber based on an analysis of the detected ion sensing current by the control system. Ion sensing may also be used to detect spark plug fouling and/or a spark plug fouling condition (i.e. a condition approaching spark plug fouling) based on an analysis of the detected ion sensing current by the control system.

In some embodiments, ignition system 88 may be configured to perform the ion sensing operation at a set interval or upon a signal from controller 12, wherein the detected current and/or ionization at the spark plug may be returned to controller 12 for analysis. In this manner, knock, misfire, preignition, and/or spark plug fouling conditions may be determined. By differentiating these combustion conditions, the control system may be able to respond by adjusting one or more operating conditions of the engine, thereby decreasing the occurrence of knock, misfire, preignition and/or spark plug fouling, which may serve to improve engine efficiency and/or performance.

In response to various operating conditions, the control system may cause combustion chamber 30 to operate in a variety of combustion modes, including a homogeneous air/fuel mode and/or a stratified air/fuel mode by controlling injection timing, injection amounts, spray patterns, etc. Further, combined stratified and homogenous mixtures may be formed in the combustion chamber. In one example, stratified layers may be formed by operating injector 66A during a compression stroke. In another example, a homogenous mixture may be formed by operating one or both of injectors 66A and 66B during an intake stroke (which may include open valve injection). In yet another example, a homogenous mixture may be formed by operating one or both of injectors 66A and 66B before an intake stroke (which may include closed valve injection). In still other examples, multiple injections from one or both of injectors 66A and 66B may be used during one or more strokes (e.g., intake, compression, exhaust, etc.). Even further examples may include different injection timings and mixture formations under different conditions, as described below.

The control system can vary the air/fuel ratio for combustion chamber 30 by controlling the amount of fuel and/or fluid delivered by injectors 66A and 66B so that the homogeneous, stratified, or combined homogenous/stratified air/fuel mixtures formed within the combustion chamber can be selected to be at stoichiometry, a value rich of stoichiometry, or a value lean of stoichiometry. While FIG. 1 shows two injectors for the cylinder, one being a direct injector and the other being a port injector, in some embodiments two direct injectors or two port injectors for the cylinder may be used and/or open valve injection may be used.

In some embodiments, the resulting relative amounts (e.g. ratio) and/or absolute amounts of a fuel (e.g. gasoline) and one or more fluids (e.g. ethanol, methanol, water, etc.) delivered to the combustion chamber via at least one of direct injector 66A and port injector 66B may be varied in response to various operating conditions. For example, the amount of ethanol that is injected may be adjusted for the amount of oxygen in the ethanol and/or fuel such as gasoline so that an increased amount of ethanol is delivered compared to the fuel. In the case of lean combustion, the amount of ethanol fuel may be adjusted for the calorific value of ethanol relative to gasoline.

As described herein, operating conditions may include the temperature of various components or systems of the engine or vehicle, ambient conditions such as air temperature and pressure, engine output such as speed, load, torque, and power, spark timing, fuel and/or fluid injection amounts, fuel and/or fluid injection timing, spark timing, detection of knock, preignition, spark plug fouling and misfire, turbo charging or super charging conditions, combinations thereof, etc. For example, the control system may be configured to detect undesirable combustion events such as knock, preignition, misfire, and/or spark plug fouling, and to respond to one or more of these events by varying the amount of at least one of the fuel and the fluid(s) delivered to the cylinder and/or spark timing. In some embodiments, the control system may be configured to vary the timing of delivery of the fuel and fluid(s) via the direct injector and/or the port injector to reduce the occurrence of knock, preignition, misfire, and/or spark plug fouling. For example, under some conditions, such as at some ratios or amounts of fuel and/or fluid, engine speed, engine load, detection of preignition or where preignition is to be reduced, the control system may delay and/or reduce a direct injection of a knock suppressing fluid such as ethanol or methanol, thereby reducing preignition. However, the control system may be configured to perform other operations in response to a reduction of a knock suppressing fluid to achieve the desired engine output and/or knock suppression. For example, the spark timing may be retarded and/or the amount of fuel delivered to the combustion chamber can be increased as the fluid is reduced. However, in some examples, engine output may be reduced and/or the cylinder may be deactivated to stop preignition.

In another example, under some conditions, such as at some ratios or amounts of fuel and/or fluid, engine speed, engine load, detection of knock or where knock is to be reduced, the control system may advance the timing of the direct injection and/or increase the amount of the direct injection or injections of a knock suppressing fluid such as ethanol, methanol and/or water so that mixing is improved and charge cooling and/or fuel octane is increased, thereby reducing knock. In this manner, the delivery of fuel and/or fluid(s) may be varied in response to operating conditions of the engine.

The control system can further be used to adjust one or more parameters that affect engine conditions in response to ion sensing or other sensors. For example, if preignition conditions are detected, the temperature within the combustion chamber and/or spark plug tip temperature may be adjusted to reduce preignition. Alternatively, if a spark plug fouling condition is detected, the temperature within the combustion chamber and/or the spark plug temperature may be adjusted so that spark plug fouling is reduced. For example, if a spark plug fouling condition is detected, the temperature of the spark plug may be increased to burn off material (e.g. carbon, soot, etc.) that may be deposited on the spark plug during operation of the engine. During this burn-off period, in a system with 2 spark plugs, the spark control can be switched to the second spark plug. In some cases, the dwell time of the spark plug may be increased to remove the fouling at the same time when the combustion temperature are at the peak, for example, at peak torque location of 15 deg. after top dead center ATDC of piston position. In this way, the combustion temperatures may assist the electrical heating of the plug. However, in some conditions, the temperature within the combustion chamber may be reduced, by using more EGR, VCT retard or lean operation, to avoid the temperature range where the deposited material may be more conductive.

Controller 12 is shown as a microcomputer, including microprocessor unit 102, input/output ports 104, an electronic storage medium 106, shown as read only memory, for storing executable programs and calibration values, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM can be generated from signal PIP in a conventional manner, and the manifold pressure signal MAP can provide an indication of vacuum, or pressure, in the intake manifold. During stoichiometric operation, this sensor can give an indication of engine load. Further, this sensor, along with engine speed, can provide an estimate of charge (including air) inducted into the cylinder. Sensor 118, which can also be used as an engine speed sensor, can produce a predetermined number of equally spaced pulses every revolution of the crankshaft.

FIG. 1 shows a variable camshaft timing system. Specifically, camshaft 130 of engine 10 is shown communicating with rocker arms 132 and 134 for actuating the intake valves and the exhaust valves. Camshaft 130 can be directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, the intake valves and exhaust valves open and close at a time earlier than normal relative to crankshaft 40. Similarly, by allowing high pressure hydraulic fluid to enter retard chamber 144, the relative relationship between camshaft 130 and crankshaft 40 is retarded. Thus, the intake valves and exhaust valves open and close at a time later than normal relative to crankshaft 40.

While this example shows a system in which the intake and exhaust valve timing are controlled concurrently, variable intake cam timing, variable exhaust cam timing, dual independent variable cam timing, or fixed cam timing may be used. Further, variable valve lift may also be used. Further, camshaft profile switching may be used to provide different cam profiles under different operating conditions. Further still, the valvetrain may be roller finger follower, direct acting mechanical bucket, electromechanical, electrohydraulic, or other alternatives to rocker arms.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another), while tooth 5 is preferably used for cylinder identification. In addition, controller 12 sends control signals (LACT, RACT) to conventional solenoid valves (not shown) to control the flow of hydraulic fluid either into advance chamber 142 or retard chamber 144.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification. In some embodiments, electric valve actuators (EVA) may be used instead of variable cam timing, cam profile switching, etc.

As described above, FIG. 1 merely shows one cylinder of a multi-cylinder engine. Each of a plurality of different cylinders can have its own set of intake/exhaust valves, one or more fuel and/or fluid injectors, one or more spark plugs, etc., and such components can be similarly configured for each of the plural cylinders, or the components for at least one such cylinder can be configured differently than the components for at least one other cylinder.

The engine may be coupled to a starter motor (not shown) for starting the engine. The starter motor may be powered when the driver turns a key in the ignition switch on the steering column, or an engine startup command is otherwise issued by the driver and/or the control system. The starter motor can be disengaged after engine starting, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 44 via an EGR valve (not shown). Alternatively, a portion of combustion gases may be retained in the combustion chambers by controlling exhaust valve timing.

As noted above, engine 10 may operate in various modes, including lean operation, rich operation, and "near stoichiometric" operation. "Near stoichiometric" operation can refer to oscillatory operation around the stoichiometric air fuel ratio. Typically, this oscillatory operation is governed by feedback from exhaust gas oxygen sensors. In this near stoichiometric operating mode, the engine may be operated within approximately one air-fuel ratio of the stoichiometric air-fuel ratio.

Feedback air-fuel ratio control may be used for providing near stoichiometric operation. Further, feedback from exhaust gas oxygen sensors can be used for controlling air-fuel ratio during lean operation and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) can be adjusted based on a desired air-fuel ratio and the air-fuel ratio from the sensor. Further still, individual cylinder air-fuel ratio control could be used, if desired. Adjustments may be made with injector 66A, 66B, or combinations therefore depending on various factors, to control engine air-fuel ratio, or by a single injector operatively coupled to a mixing valve.

With the combination of two substances, such as with gasoline and an alcohol (e.g. ethanol and/or methanol), the air/fuel correction in the feedback control may be adjusted in a feedforward basis based on the oxygen content in alcohol and the amount of alcohol injected. This can enable the control system to a more rapid and robust response in conditions where the ratio of alcohol to fuel is changed in a dynamic manner. Also, this method can be used to normalize the fuel adaptation mechanism.

Also note that various methods can be used to maintain the desired torque, such as, for example, adjusting ignition timing, throttle position, variable cam timing position, exhaust gas recirculation amount, number of cylinders carrying out combustion and/or air/fuel ratio. Further, these variables can be individually adjusted for each cylinder to maintain cylinder balance among all the cylinders. While not shown in FIG. 1, engine 10 may be coupled to various boosting devices, such as a supercharger or turbocharger, as shown in FIG. 2.

Figure 2:
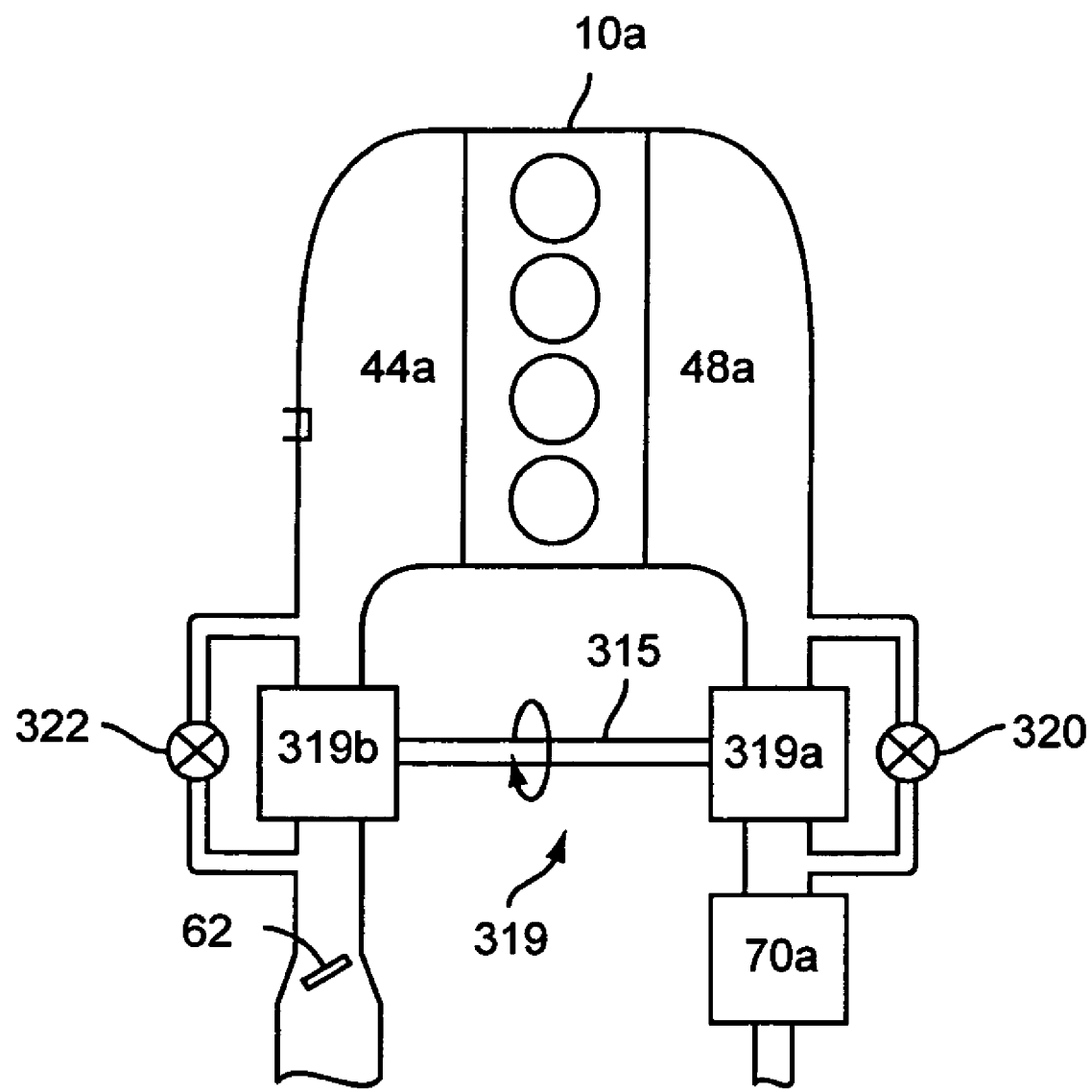
FIG. 2 shows a schematic diagram of an engine having a turbocharger.

FIG. 2 schematically shows an example engine 10a having four cylinders in an in-line configuration. In one embodiment, engine 10a may have a turbocharger 319, which has a turbine 319a coupled in the exhaust manifold 48a and a compressor 319b coupled in the intake manifold 44a. While FIG. 2 does not show an intercooler, one may optionally be used. Turbine 319a is typically coupled to compressor 319b via a drive shaft 315. Various types of turbocharger arrangements may be used. For example, a variable geometry turbocharger (VGT) may be used where the geometry of the turbine and/or compressor may be varied during engine operation by the control system. Alternately, or in addition, a variable nozzle turbocharger (VNT) may be used when a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as a waste gate valve. FIG. 2 shows an example bypass valve 320 around turbine 319a and an example bypass valve 322 around compressor 319b, where each valve may be controller via the control system. As noted above, the valves may be located within the turbine or compressor, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.). Further, a supercharger may be used, if desired.

Figure 3A:
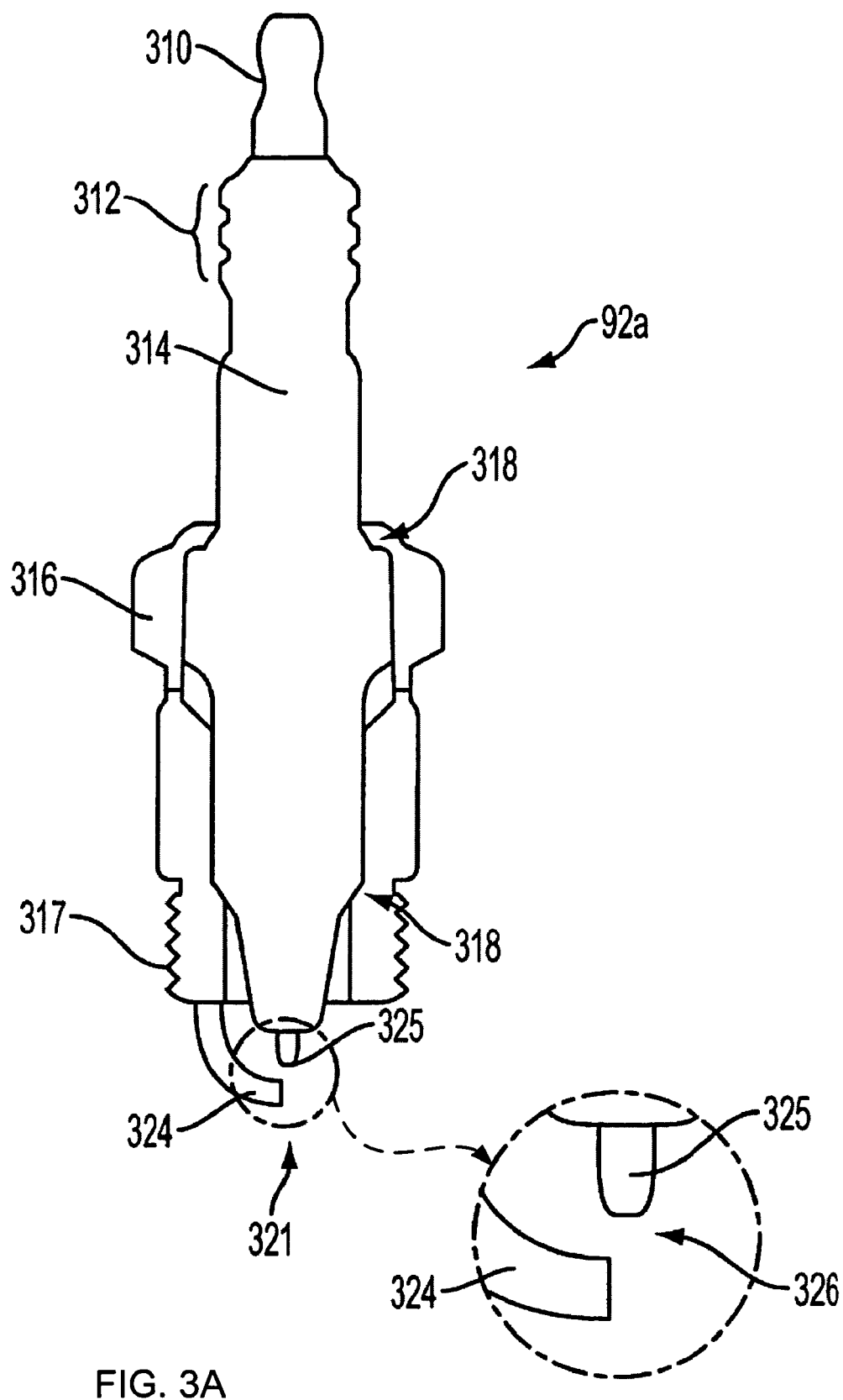
FIG. 3A shows a schematic diagram of an example spark plug.

FIG. 3A schematically shows an example spark plug 92a. While spark plug 92a and other types of spark plugs can be used in combustion chamber 30 of FIG. 1, it should be understood that spark plug 92a is just one example of a spark plug device. Spark plug 92a has a generally cylindrical shape, in which an upper portion is located outside of the combustion chamber and a spark plug tip 321 is located within the combustion chamber. The upper portion includes a terminal 310, which may be coupled to an ignition system, enabling electric current to flow from the ignition system into a conductive inner core of the spark plug. In some embodiments, terminal 310 may be configured to receive electric current for performing a spark. The terminal may also be configured to receive a second electric current for powering a spark plug heating system of the spark plug. Alternatively, spark plug 92 may not include a heating system.

Continuing with FIG. 3A, an insulating portion 314 and a conductive portion 316 are shown, and provide an outer shell of the spark plug surrounding a conductive inner core (not shown). In some examples, insulating portion 314 may contain one or more surface ribs 312 used to improve insulation of the spark plug and prevent electrical energy from leaking from the terminal to the conductive portion along the side of the spark plug. In some examples, insulating portion 314 may include aluminum oxide ceramic; however, other materials may be used. Conductive portion 316 is shown including threads 317, which can be used to screw the spark plug into an opening in the combustion chamber, enabling seals 318 to reduce communication of air or other gases between outside of the combustion chamber and inside the combustion chamber.

Spark plug tip 321 may include a center electrode 325 communicating electrically with terminal 310 via an internal conductive core. Furthermore, a side electrode 324 is shown coupled to conductive portion 316. A spark gap 326 is shown between the center and side electrodes for generating a spark responsive to an applied voltage. Conductive portion 316 can perform various functions. In some examples, the conductive portion can be made of an electrically conductive metal that enables electric current to flow between the side electrode and wall of the combustion chamber, thereby grounding the side electrode. Furthermore, the conductive portion can be used to transfer heat between the spark plug and the wall of the combustion chamber.

The exact material composition, size, and shape of various portions of the spark plug may affect the heat range of the spark plug. By varying the length, width, and/or material of various portions, the heat range and therefore the operating temperature of the spark plug may be varied. In one example, the relative amount of material comprising insulating portion 314 may be reduced compared to conductive portion 316, thereby increasing the rate of heat transfer from the spark plug tip and decreasing the temperature of the spark plug for a given condition of the engine. In another example, the length of the center electrode extending beyond the insulating portion of the spark plug tip may be increased, thereby increasing the temperature at the tip of the center electrode for a given engine condition. It should be appreciated that additional variations in spark plug design for various heat ranges and operating conditions may be used.

In some conditions, carbon or soot may form on combustion chamber surfaces and spark plugs. For example, carbon may be deposited on the spark plug when the air/fuel mixture is too rich to permit complete burning of the fuel/air charge. Carbon deposited on the spark plug ceramic shell surrounding the center electrode, among other portions of the spark plug, may become conductive under certain conditions (e.g. at tip temperatures over approximately 343° C. (650° F.)) and can shunt the ignition spark to ground, potentially resulting in spark plug fouling and/or misfire. In particular, the deposited carbon may become highly conductive when spark plug tip temperatures are between approximately 343° C. (650° F.) and 510° C. (950° F.). However, at tip temperatures less than approximately 343° C. (650° F.), the deposited carbon may be less conductive. At temperatures greater than approximately 510° C. (950° F.) the deposited carbon may be burned off of the spark plug, reducing the occurrence of spark plug fouling. It should be appreciated that these temperatures are approximate and are provided as examples. Thus, the temperature within the combustion chamber and/or the temperature of the spark plug may be adjusted so that spark plug fouling can be reduced.

In some conditions, the rate at which carbon is deposited on the spark plug may vary with air/fuel ratio. For example, in some conditions, carbon and/or soot may accumulate at air/fuel ratios near 14.0:1, but the rate of accumulation at air/fuel ratios less than 12.5:1 may be much faster. This accumulated carbon and/or soot may prevent firing of the spark plug to a point where spark plug replacement and/or cleaning may be the only way to restore function. Thus, the rate of carbon accumulation may be varied by adjusting the air/fuel ratio.

In some conditions, the temperature within combustion chamber 30 may be high enough to cause preignition of the mixture (e.g. air, fuel, ethanol, water, etc.) potentially resulting in engine knock, component damage, noise and vibration harshness (NVH), inefficient engine operation, piston/valve damage, etc. For example, the portion or tip of the spark plug exposed to or disposed within the combustion chamber may reach a temperature high enough to cause preignition. As will be described below, preignition may be reduced by decreasing the temperature within the combustion chamber and/or decreasing the spark plug tip temperature.

Figure 3B:
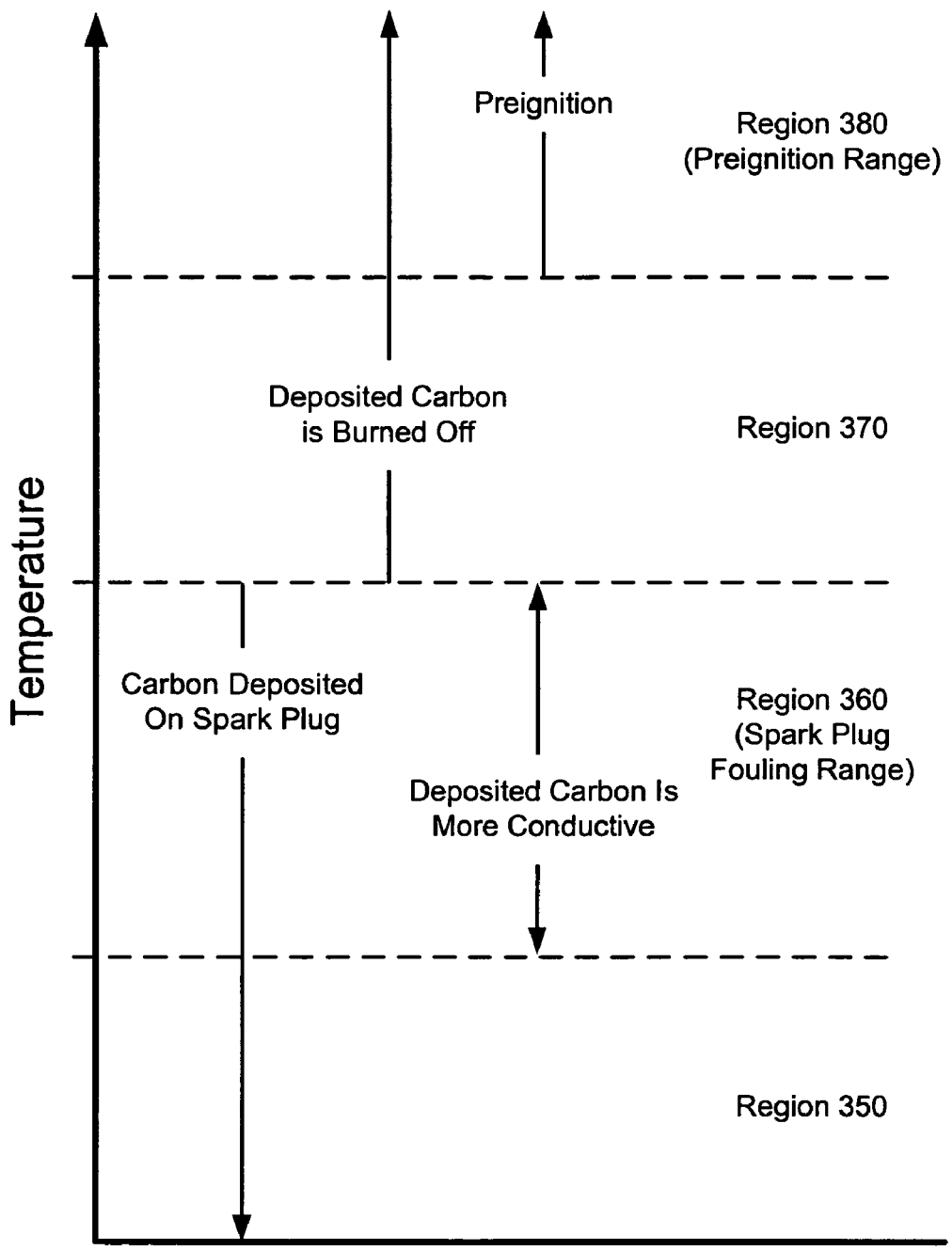
FIG. 3B is a graph showing various temperature ranges for an example spark plug.

FIG. 3B is a graph showing several temperature operating regions of an example spark plug. Temperature regions 350, 360, 370, and 380 represent spark plug tip temperature ranges at which various conditions may occur, such as fouling or preignition. In particular, FIG. 3B shows Regions 350 and 360 representing the tip temperature range where carbon and/or soot may be deposited on the spark plug tip. As described above, carbon may be deposited on the spark plug when tip temperatures are less than a temperature where the carbon is burned-off. However, the deposited carbon may be more conductive at some temperature ranges as defined by Region 360. This conductive carbon can reduce the effectiveness of the spark plug to produce an ignition spark or it may completely inhibit ignition resulting in misfire. Thus, Region 360 shows the temperature range where spark plug fouling may occur. At higher temperatures, as defined by Regions 370 and 380, the deposited carbon can be burned off of the spark plug tip, thereby reducing fouling. However, at very high temperatures, as defined by Region 380, the tip temperature may be sufficiently hot to cause preignition or surface ignition of the air/fuel mixture.

Thus, in some conditions, the spark plug may be operated in Region 350 and/or Region 370 to reduce or avoid spark plug fouling and/or preignition. Some substances such as fluids containing ethanol may be less prone to causing spark plug fouling. Thus, in some embodiments, the control system can be configured to increase the amount of a fluid such as ethanol delivered to the combustion chamber and/or reduce the amount of a fuel such as gasoline when the engine is operated at temperatures where spark plug fouling may occur. In this way, one or more cylinders of the engine may utilize greater amounts of ethanol to achieve combustion without causing spark plug fouling. Furthermore, as will be described below, engine conditions may be adjusted to maintain cylinder and/or spark plug temperature within a range where the occurrence of preignition or spark plug fouling is reduced or avoided.

Figure 3C:
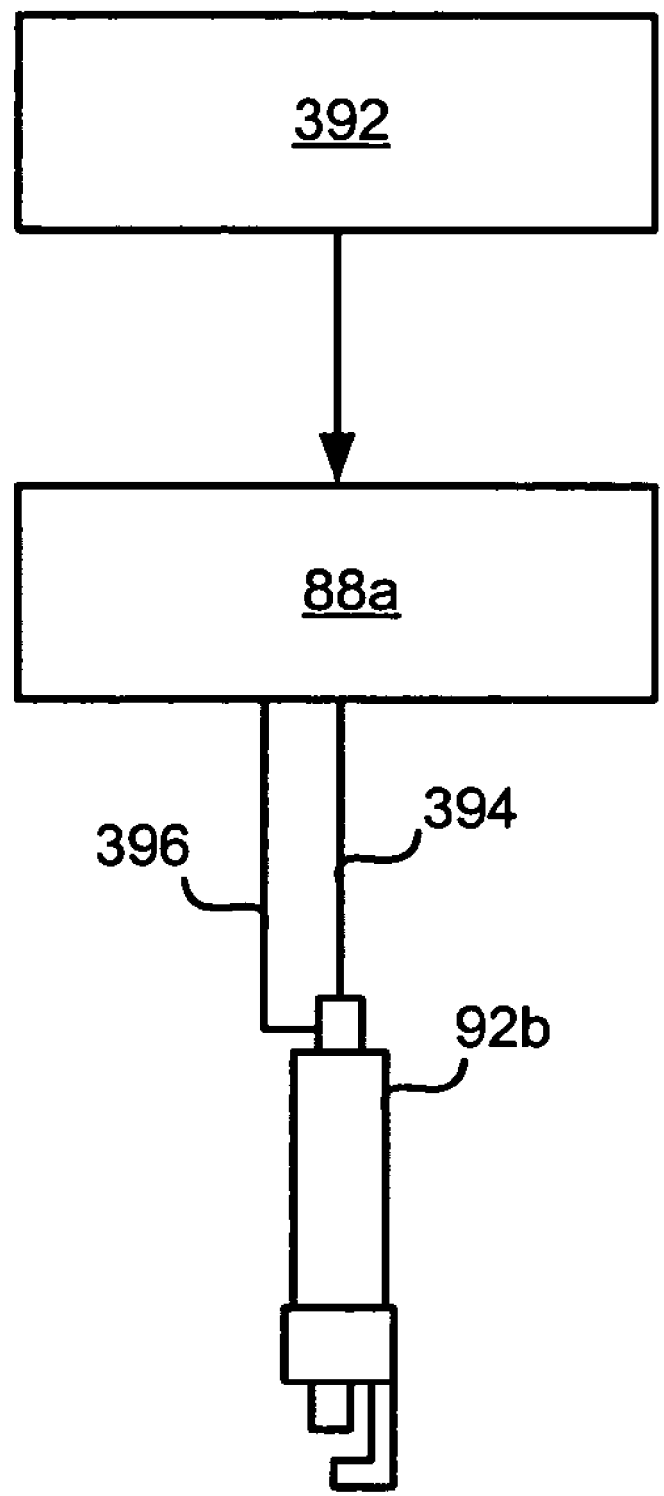
FIG. 3C shows a schematic diagram of an example ignition system including a spark plug heating system.

In some embodiments, an ignition system, such as ignition system 88 and associated spark plug 92 of FIG. 1, may include a spark plug heating system. As a nonlimiting example, FIG. 3C shows ignition system 88A configured to supply electrical energy to spark plug 92b by electrical connection 396 for providing spark plug temperature control via electric resistance heating. Furthermore, an energy storage device 392 (e.g. a battery) may be used to supply electrical energy to ignition system 88A. While this arrangement and other ignition system configurations disclosed herein can be used with cylinder 30 of FIG. 1, it should be understood that such arrangements can also be used with different engine configurations.

In some embodiments, spark plug 92b may include an internal ceramic heater, for example, similar to the heating system used with a HEGO sensor. In some embodiments, a thin film resistive heater may be disposed within a portion of the spark plug or on a surface of the spark plug. The amount of spark plug heating may be adjusted by varying the electric current supplied to the spark plug via electrical connection 396 in addition to providing sparking operation via electrical connection 394. Alternatively, other types of spark plug heating may be used to control spark plug temperature. In this manner, the control system may be configured to adjust the temperature of the spark plug during engine operation. For example, the amount of heating may be varied with operating conditions, such as an estimated temperature of the plug, a likelihood of pre-ignition, a likelihood of fouling, an amount of gasoline and/or alcohol delivered to the engine, a boosting amount, engine load, and/or others.

FIGS. 4-8 show several example routines for controlling engine operation. In some examples, these routines may utilize information regarding the composition of an injection and/or fuel type. For example, if ethanol is contained in a fuel being injected, an estimate of the amount of ethanol (absolute, fractional, etc.) may be used to control operation. Thus, when using separate injection of a first and second substance, by providing an accurate estimate of an ethanol fraction in the second substance, for example, it can be possible to provide appropriate amounts of the first and second substances to enable improved spark timing, reduced knock tendency, and reduced potential for preignition.

Figure 4:
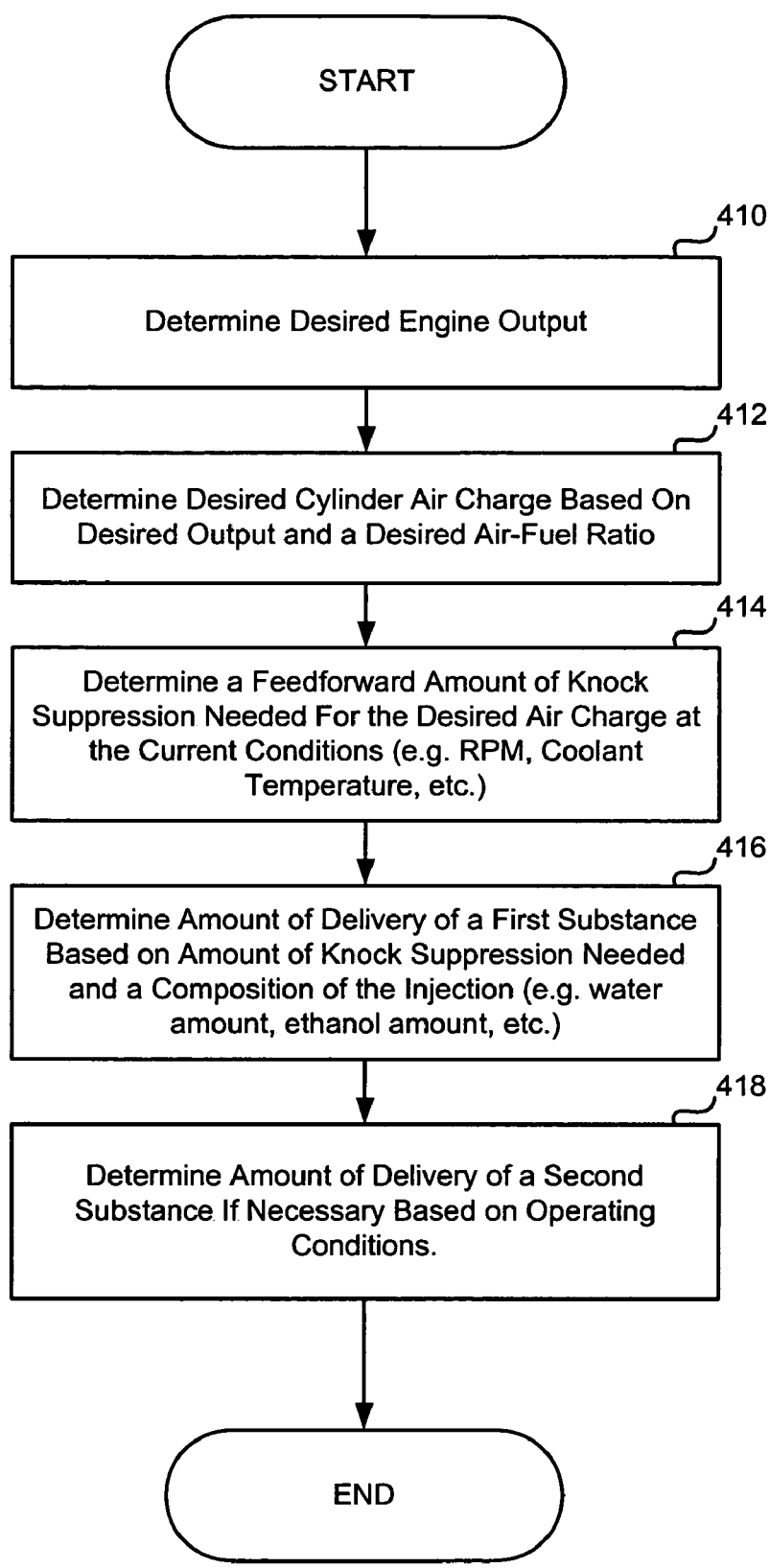
FIGS. 4-9 show example engine control routines.

FIG. 4 shows an example routine for controlling engine operation based on an amount of a fuel and/or fluid provided to the combustion chamber. The approach illustrated by FIG. 4 may be applied to various combinations of substances and injection types, and is not limited to the below described ethanol/gasoline blend.

At 410, the routine determines a desired engine output, such as a desired engine output torque, based on various operating conditions, such as driver pedal position, vehicle speed, gear ratio, etc. Next, at 412, the routine determines a desired cylinder air charge amount based on the desired output (e.g. torque, speed, power, etc.) and a desired air-fuel ratio. At 414, the routine determines a feedforward amount of knock suppression needed for the desired output at the current operating conditions (e.g., air-fuel ratio, RPM, engine coolant temperature, among others). Alternatively, the routine may determine a desired charge cooling or knock reduction based on current operation conditions, and optionally based on feedback from a knock sensor or other sensor indicative of knock.

At 416 and 418 the routine determines a delivery amount of a first substance and a second substance delivered to the combustion chamber based on the amount of knock suppression needed and a composition of the substances (e.g., the ethanol fraction or amount, the water fraction or amount, or others). Depending on the composition of the substance, either a greater or lesser knock suppression effect may be achieved. Finally, the routine ends.

Figure 5:
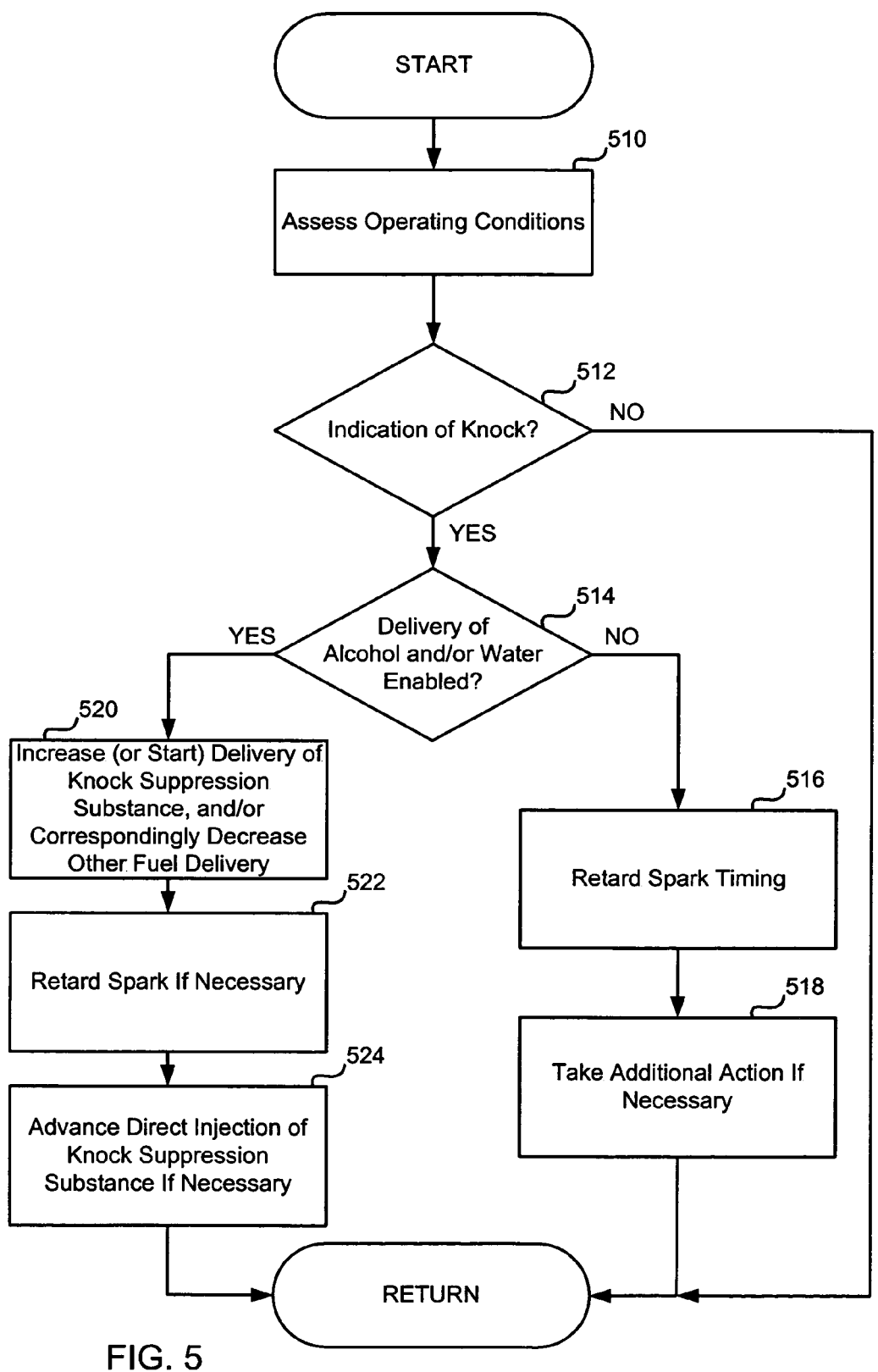

FIG. 5 shows a routine for reacting to an indication of engine knock, such as from a knock sensor, cylinder pressure sensor, or other indication that knock is occurring, or is about to occur. At 510 the routine reads current operating conditions, such as speed, load, etc. Then, at 512, the routine determines whether a measure of knock from a knock sensor has reached a threshold value. As noted above, various other indications for detecting knock may additionally or alternatively be used.

If knock is not indicated at 512, the routine may return. Alternatively, if knock is indicated at 512, the routine continues to 514 to determine whether delivery of a knock suppression substance (e.g., whether delivery of alcohol and/or water) is enabled. In other words, the routine determines whether conditions are acceptable for delivery of a knock suppression substance, based on, for example, coolant temperature, time since an engine start, and/or others. If conditions are not acceptable for delivery of a knock suppression substance, then the routine proceeds to 516 to retard spark timing to reduce knock, and then takes additional actions at 518, optionally, if necessary, such as reducing airflow and/or reducing preignition, etc.

If the answer at 514 is yes, the routine proceeds to 520 to increase delivery of a knock suppression substance (e.g. ethanol, methanol, water, etc.) and correspondingly decrease other fuel delivery (e.g., port gasoline injection), assuming such an increase is acceptable given potential limits on increasing alcohol delivery under conditions that may increase likelihood of preignition. For example, a desired ethanol, methanol and/or water amount or ratio to gasoline may be increased, but limited below values that may increase the likelihood of preignition above acceptable levels. Alternatively, the desired ethanol, methanol, and/or water amount or ratio to gasoline may be increased to where preignition may occur, but with steps taken to reduce preignition. Also, the amount of increase and/or decrease may be varied depending on an amount of water or other substance in the knock suppression delivery (e.g., an amount/percentage of water in a water/ethanol direction injection).

In other words, spark retard and other operations as noted herein to reduce knock may be used if delivery of alcohol (e.g. ethanol or methanol) and/or water, for example via direct injection, is near a maximum available or allowed amount (e.g., due to limits related to preignition). Thus, at 522, spark may optionally be retarded relative to its current timing before or concurrently with adjustments made at 520, and then spark timing may be returned to the previous timing once the fuel adjustments take effect.

At 524, the timing of delivery of a knock suppression substance (e.g. a fluid including at least one of water, ethanol, methanol, etc.) may be optionally adjusted. For example, a direct injection of ethanol may be advanced, if desired. In this manner, the earlier direct injection of the fluid can reduce knock by enabling increased mixing and thus increased charge cooling effects. However, the direct injection of some knock suppressing fluids such as ethanol or methanol may be more susceptible to preignition when the injection timing is advanced. Thus, the timing of a direct injection of ethanol and/or methanol may be balanced between the functions of suppressing knock and reducing preignition.

Further, other adjustments may be made, such as reducing boosting, reducing manifold pressure, etc. Note that the combination of spark timing and injection adjustment may be beneficial in that the spark timing change may have a faster effect on knock than the fuel change under some conditions. However, once the injection adjustment has been effected, the spark timing may be returned to avoid fuel economy losses. In this way, fast response and low losses can be achieved. Under some conditions, only spark adjustments, or only fuel and/or fluid adjustments without spark adjustments may be used so that even temporary retard of spark timing is reduced.

As noted above, manifold pressure may be adjusted, for example, via a variable geometry turbocharger, electrically controlled supercharger, adjustable compressor bypass valve, a waste gate and/or electronic throttle control in response to an amount of ethanol (or relative amount of ethanol) or other substance delivered to the combustion chamber, speed, desired torque, transmission gear ratio, etc.

Figure 6:
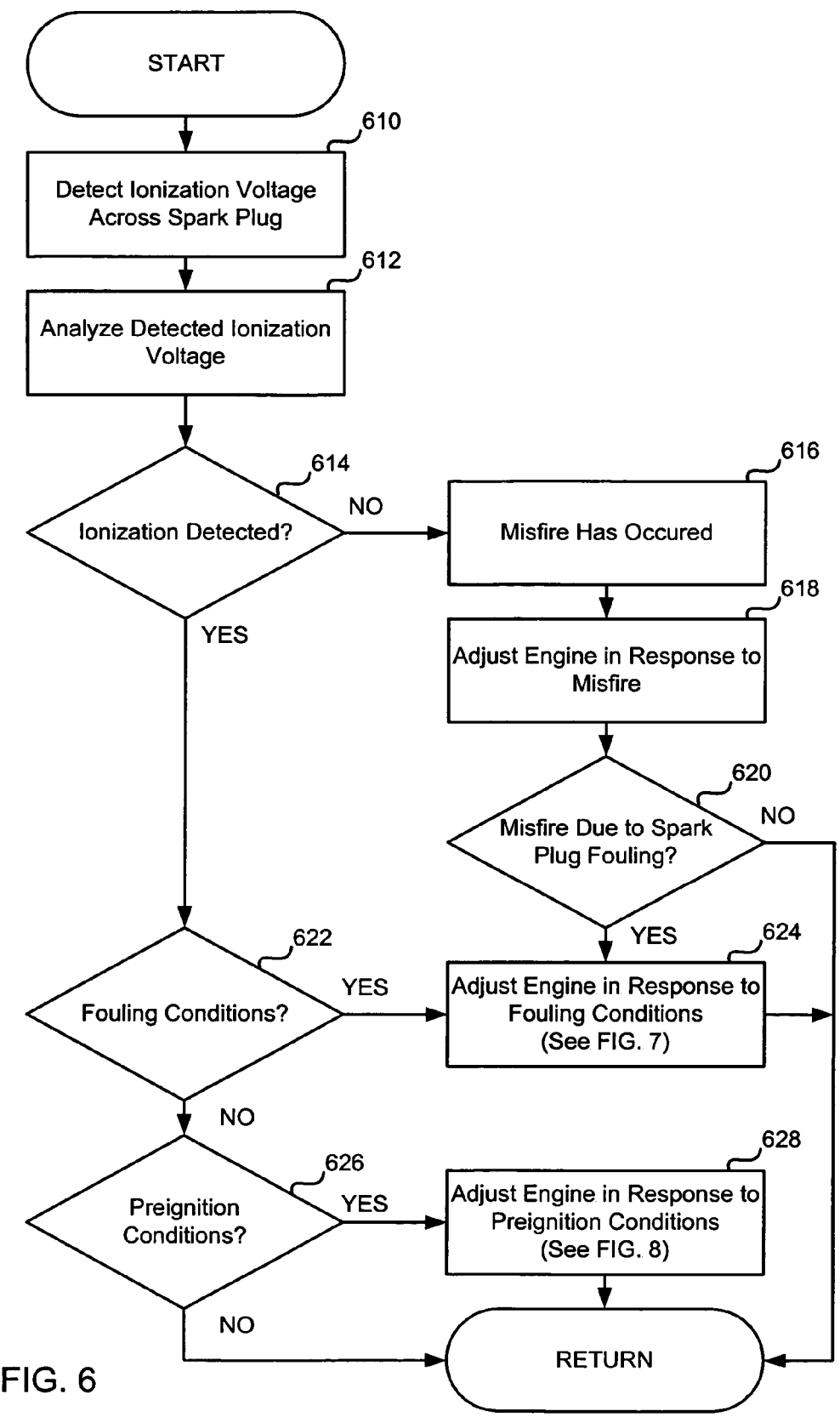

FIG. 6 shows a routine for determining conditions within the combustion chamber by detecting ionization at the spark plug. During combustion, dissociation may occur, forming radicals/ions within the combustion chamber. By monitoring the ionization at the spark plug during the compression and/or expansion stroke, a determination may be made of the combustion process. For example, combustion of a fuel and/or one or more fluids within the combustion chamber may produce a first ionization at the spark plug indicative of whether there is a spark plug fouling condition that may be detected, for example, by measuring the current signal responsive to a voltage applied across the spark plug (i.e. ion sensing). In another example, combustion of a fuel and/or one or more fluids within the combustion chamber may produce a second ionization at the spark plug indicative of a preignition condition that may be detected by ion sensing.

Ionization may also be detected during other times during the engine cycle, such as during the intake and/or exhaust strokes. Ionization detection or ion sensing may be used by the engine control system (e.g. controller 12) to adjust operating conditions of the engine, thereby reducing preignition, misfire, knock and spark plug fouling.

The ionization at the spark plug may be detected at 610. Next, at 612, the detected ionization may be analyzed by the control system, for example, by comparing the detected current responsive to a voltage applied across the spark plug to signals associated with various combustion conditions, such as misfire, preignition, spark plug fouling, knock, etc. At 614 it is judged whether ionization has been detected. If the answer is no, then it may be concluded at 616 that misfire has occurred, wherein the engine may be adjusted in response to misfire at 618. For example, the spark plug may be controlled to overcome misfire by performing additional and/or higher energy ignition sparks to initiate combustion. In another example, if the combustion chamber includes a second spark plug, the second spark plug may be controlled to perform an ignition spark. Next, it may be judged at 620 whether misfire was due to spark plug fouling. In some examples, spark plug fouling may be determined based on past or current operating conditions of the engine, such as combustion chamber and/or spark plug temperature, etc. For example, if the cylinder was operating at a temperature where deposited carbon is more conductive before misfire was detected, it may be concluded that misfire was caused by spark plug fouling. If the answer at 620 is no, the routine returns. If the answer at 620 is yes, the routine proceeds to 624.

If the answer at 614 is yes (i.e. ionization has been detected), then it may be judged at 622 whether fouling conditions have been detected and whether at 626 preignition conditions (e.g. preignition has occurred or preignition may occur) have been detected. If a fouling condition has been detected, then the engine may be adjusted at 624 in response to the detected fouling condition. For example, the temperature of the combustion chamber and/or spark plug may be increased for one or more of the subsequent engine cycles. A further discussion of the response to spark plug fouling detection may be found below with reference to FIG. 7. If preignition conditions are detected (e.g. the combustion chamber temperature is within a temperature range where preignition of the fuel and/or fluid may occur), then the engine may be adjusted at 628 in response to the detected preignition conditions. For example, the temperature of the combustion chamber and/or spark plug may be decreased for subsequent engine cycle(s). A further discussion of the response to detected preignition conditions may be found below with reference to FIG. 8.

In some embodiments, misfire, preignition, and/or fouling conditions may be detected by other methods in addition to or independent of detecting the ionization at the spark plug. For example, various sensors may be used to detect combustion chamber and/or spark plug temperature. In another example, preignition or fouling conditions may be estimated based on operating conditions of the engine such as the type and/or amount of injections used, engine speed, engine load, engine torque, etc.

Figure 7:
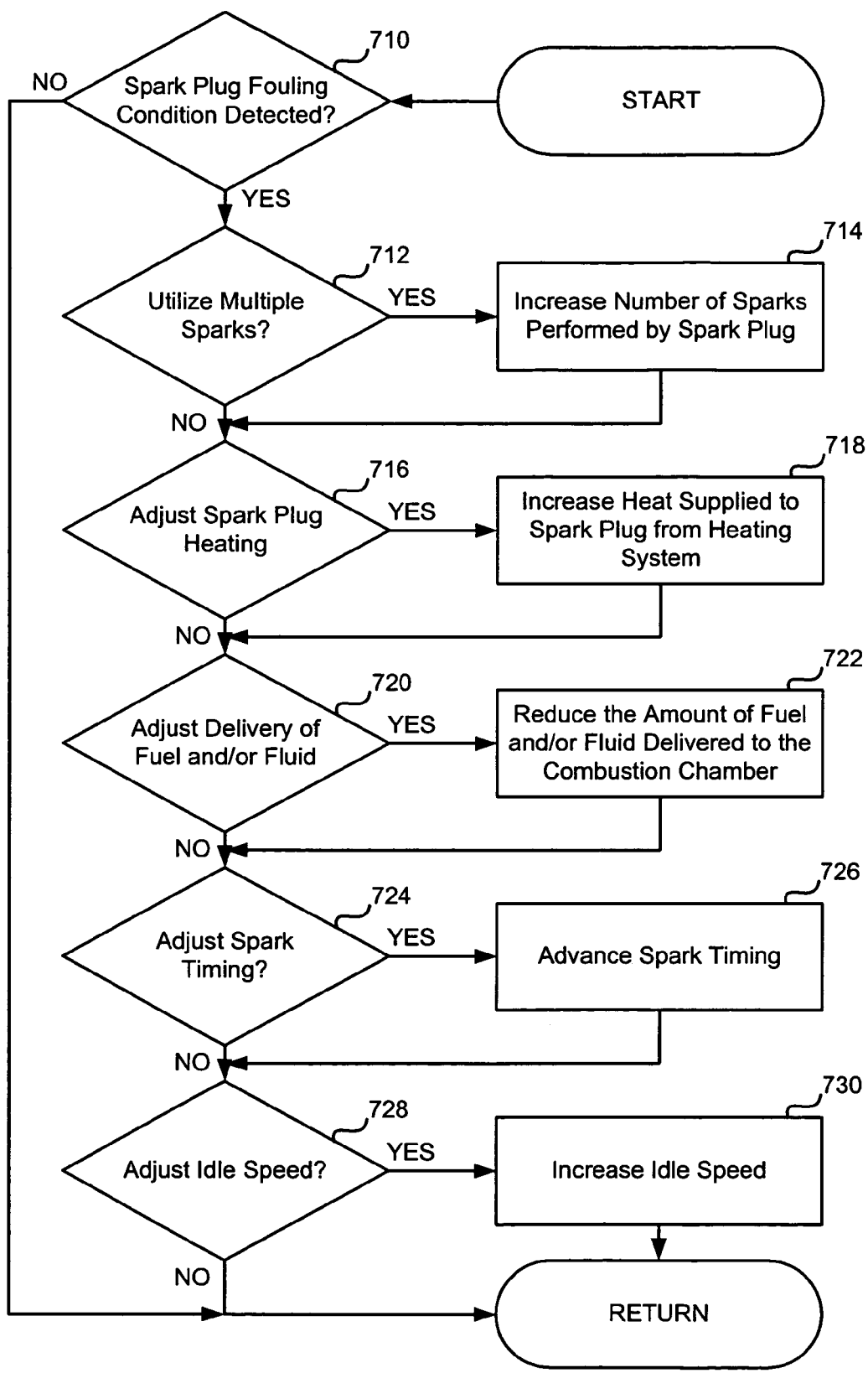

FIG. 7 shows a routine for adjusting one or more operating conditions of the engine responsive to a spark plug fouling condition (e.g. spark plug fouling has occurred or may occur). In some embodiments, spark plug fouling may be detected by ion sensing and/or temperature sensing of the combustion chamber, spark plug, engine coolant, exhaust gas temperature, etc. In some embodiments, the control system may be configured to predict spark plug fouling conditions based on other operating conditions such as the amount and/or 0 timing of the fuel and/or fluid delivered to the combustion chamber, engine output, etc. In some embodiments, a spark plug fouling condition may be inferred by the control system from a detected misfire.

At 710 it may be judged whether a spark plug fouling condition has been detected. If the answer is no, the routine may return to 710, where the engine is monitored for spark plug fouling conditions, for example, as shown in FIG. 6. Alternatively, if the answer at 710 is yes, then one or more operating conditions of the engine may be adjusted.

For example, at 712 it may be judged whether to utilize multiple sparks from a spark plug. If the answer is yes, the number of sparks performed by the spark plug may be increased. For example, by increasing the quantity and/or frequency and/or energy of sparks performed by the spark plug over one or more cycles, then the temperature of the spark plug may be increased, thereby reducing spark plug fouling. In some examples, the spark plug may perform one or more additional sparks during the compression and/or expansion strokes, after combustion has been initiated by an ignition spark. One or more additional sparks may additionally or alternatively be performed during some or all of the exhaust, intake, compression, and expansion strokes. If it is determined not to utilize multiple sparks to increase spark plug temperature, then one or more other control operations may be performed. For example, multiple sparks may not be used if battery storage or state of charge is low. In another example, multiple sparks may not be used if spark plug wear is to be reduced. In yet another example, multiple sparks may not be used if the temperature of an ignition coil and/or a portion of the ignition system coupled to the spark plug is above a threshold temperature, or other conditions indicate possible damage to the ignition system could result.

At 716, it may be judged whether to adjust spark plug heating. If the answer at 716 is yes, at 718 heat supplied to the spark plug by a spark plug heating system can be increased, thereby increasing the temperature of the spark plug and/or reducing spark plug fouling. In some embodiments, spark plug heating may be provided by electric resistance heating from electrical energy supplied by the vehicle battery. Thus, if battery storage or state of charge of an energy storage device configured to power the spark plug heating system is low, then the control system may decide not to use spark plug heating.

At 720, it may be judged whether to adjust the delivery of fuel and/or fluid to the combustion chamber. If the answer at 720 is yes, the amount of fuel (e.g. gasoline) and/or fluid (e.g. ethanol, methanol, water, etc.) supplied to the combustion chamber can be reduced at 722, which may or may not vary the ratio of the fuel and fluid delivery. Alternatively, the amount of fuel can be reduced as the amount of ethanol is increased or vice versa. If the amount of at least one of the fuel and fluid or fluids is decreased, then the temperature of the spark plug and/or combustion chamber may be increased due to the reduction of charge cooling, thereby reducing spark plug fouling. In addition, decreased fuel leads to less rich air/fuel ratio, which may reduce spark plug fouling. Alternatively, it may judged to not reduce the amount of fuel and/or fluid based on factors such as driver requested torque and/or desired knock suppression, for example.

At 724, it may be judged whether to adjust the spark timing. If the answer at 724 is yes, the spark timing can be advanced at 726. If the spark timing is advanced, then the temperature of the spark plug and/or combustion chamber may be increased, thereby reducing spark plug fouling. Alternatively, it may be judged at 724 to not advance spark timing if spark timing has reached an advance limit. For example, spark advance and/or spark retard may be limited by the desired combustion timing relative to piston position within the combustion chamber, by combustion stability, by ignitability/flammability limits, etc.

At 728, it may be judged whether to adjust the idle speed of the engine. If the answer is yes, the idle speed can be increased at 730. If the idle speed is increased, then the temperature of the spark plug and/or combustion chamber may be increased, thereby reducing spark plug fouling. Alternatively, if the answer at 728 is no, the routine may return to 710. In some examples, it may be undesirable to increase idle speed if engine efficiency is substantially reduced, if NVH is substantially increased, or if engine output substantially exceeds driver demand. It should be appreciated that some engines may be configured to perform a subset of the above described adjustments and/or different adjustments in order to increase the temperature of the spark plug and/or combustion chamber to reduce spark plug fouling and/or misfire.

For example, an engine configured to utilize gasoline as the fuel and ethanol as the knock suppressing fluid can be configured to respond to a detection of fouling or fouling conditions by using none, one, some, or all of the control strategies described in FIG. 7. Upon detection of spark plug fouling or anticipation of fouling, the control system may increase and/or advance the timing of ethanol delivered to the combustion chamber. Additionally, the control system may concurrently decrease the amount of gasoline delivered to the combustion chamber and/or advance the spark timing. Furthermore, the spark plug may be controlled to spark more than once per cycle and/or spark plug heating may be increased where additional spark plug heating is desired to reduce spark plug fouling.

Figure 8:
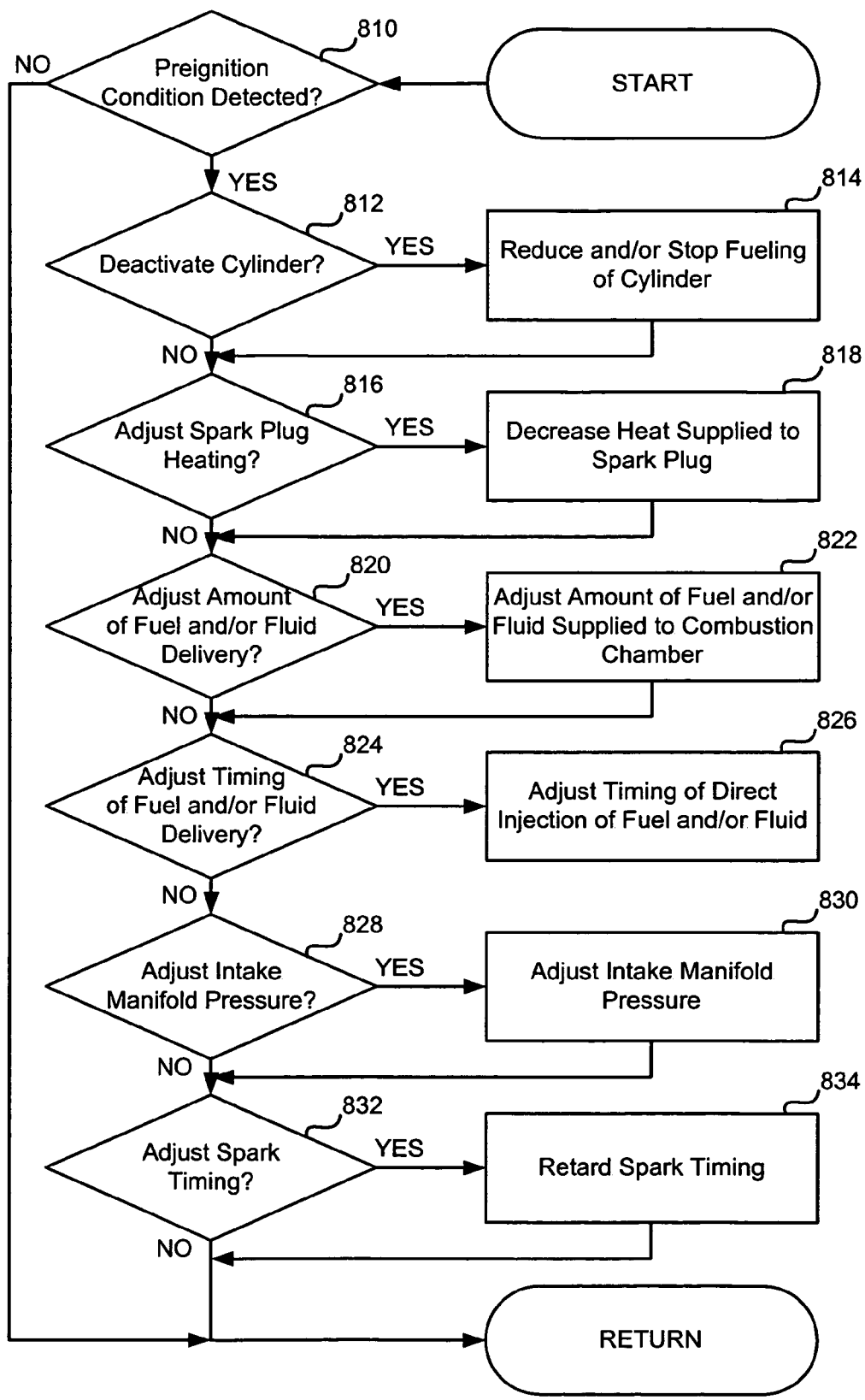

FIG. 8 shows a routine for adjusting one or more operating conditions of the engine responsive to a preignition condition (e.g. preignition has occurred or may occur). In some embodiments, preignition may be detected by ion sensing and/or temperature sensing of the combustion chamber, spark plug, engine coolant, exhaust gas temperature, etc. In some embodiments, the control system may be configured to predict preignition conditions based on other operating conditions such as the amount and/or timing of the fuel and/or fluid delivered to the combustion chamber, engine speed, engine load, engine torque, air/fuel ratio, previous patterns of engine operating condition, etc. In some embodiments, a preigntion condition may be inferred by the detection of engine knock.

At 810 it may be judged whether a preignition condition has been detected. If the answer at 810 is no, the routine returns wherein the engine may be monitored, for example, as shown in FIG. 6. Alternatively, if the answer at 810 is yes, one or more operating conditions of the engine may be adjusted.

For example, at 812 it may be judged whether to deactivate the cylinder (e.g. discontinue combustion), which may include reducing and/or discontinuing delivery of fuel and/or fluid to the combustion chamber and/or positioning one or more intake or exhaust valves in an opened or closed position. If the answer is yes, at 814 the delivery system may stop delivering fuel and/or fluid to the cylinder for one or more cycles and/or otherwise deactivate one or more cylinders. If combustion is discontinued in the cylinder, then the temperature of the spark plug and/or combustion chamber may be reduced, thereby reducing preignition. Alternatively, cylinder deactivation may not be used during some conditions, for example, if a high engine torque is desired.

At 816, it may be judged whether to adjust spark plug heating provided by a spark plug heating system. If the answer at 816 is yes, heat supplied by the spark plug heater can be decreased or discontinued at 818, thereby decreasing the temperature of the spark plug and/or cylinder.

At 820, it may be judged whether to adjust the amount of fuel and/or fluid delivered to the combustion chamber. If the answer at 820 is yes, the amount of fuel (e.g. gasoline, etc.) and/or fluid (e.g. ethanol, methanol, water) supplied to the combustion chamber can be increased at 822, which may or may not vary the ratio of the fuel and fluid delivery. Alternatively, the amount of fuel can be increased as the amount of ethanol is decreased or vice versa. By increasing the amount of fuel and/or fluid, the charge cooling effects can be increased, thereby reducing the temperature of the cylinder and/or spark plug. However, it may be determined not to increase the amount of fuel and/or fluid supplied to the combustion chamber, for example, if such operation would result in inefficient engine operation, engine knock, or if a fuel delivery limit has already been reached. Or, if a substance such as ethanol may increase the tendency towards preignition, then the amount of such substance may be decreased while the amount of gasoline and/or water is increased.

At 824, it may be judged whether to adjust the timing of fuel and/or fluid delivery. If the answer is yes, the timing of a direct injection of fuel and/or fluid may be adjusted at 826. For example, the timing of a direct injection of a knock suppressant substance may be controlled between an injection timing where volumetric efficiency is increased and/or maximized and an injection timing where suppression of preignition is increased and/or maximized. Thus, in some embodiments, the control system may vary the timing of a direct injection of a knock suppressing substance so that preignition is avoided while maintaining a high and/or maximum possible volumetric efficiency. In some conditions, the timing of a direct injection of a knock suppressing substance can be retarded in response to a detection of preignition or preignition conditions.

At 828, it may be judged whether to adjust the intake manifold pressure. If the answer is yes, the electronic throttle, waste gate, compressor bypass and/or other variable boost device can be adjusted at 830. If manifold pressure is decreased, then the temperature of the spark plug and/or combustion chamber may be reduced, thereby reducing preignition. However, it may be judged not to decrease manifold pressure if lower than desired engine output results and other means of avoiding preignition are feasible.

At 832, it may be judged whether to adjust spark timing. If the answer is yes, the spark timing may be retarded at 834. By retarding the spark timing, the temperature of the spark plug and/or combustion chamber may be decreased, thereby reducing preignition. If the answer at 832 is no, the routine may return to 810. It should be appreciated that some engines may be configured to perform a subset of the above described adjustments and/or different adjustments in order to decrease the temperature of the spark plug and/or combustion chamber to reduce preignition.

For example, an engine configured to utilize gasoline as the fuel and a substance such as ethanol as the knock suppressing fluid can be configured to respond to a detection of preignition or preignition conditions by using none, one, some, or all of the control strategies described in FIG. 8. For example, upon detection of preignition or anticipation of preignition, the control system may reduce and/or retard the timing of ethanol delivered to the combustion chamber. Additionally, the control system may concurrently increase the amount of gasoline delivered to the combustion chamber and/or retard the spark timing. Furthermore, the spark plug may be controlled to spark only once per cycle and/or spark plug heating may be reduced where additional spark plug heating is not required to reduce spark plug fouling.

In another example, upon detection of knock or anticipation of knock, the control system may increase and/or advance the timing of ethanol delivered to the combustion chamber. Additionally, the control system may concurrently decrease the amount of gasoline delivered to the combustion chamber and/or advance the spark timing.

Thus, combustion conditions within an engine configured to utilize a fuel and a knock suppressing fluid (e.g. ethanol, methanol, water, etc.) may be detected at least in part by measuring the ionization at a spark plug. If preignition, misfire, or fouling conditions are detected via the measured ionization or other method of detection, then the engine may be adjusted in response to the detected condition. In addition, the adjustment of fuel types and other substances used during combustion may further be used to reduce engine knock. In this manner, engine operation may be improved, NVH may be reduced, component damage may be avoided and/or engine efficiency may be increased.

Figure 9:
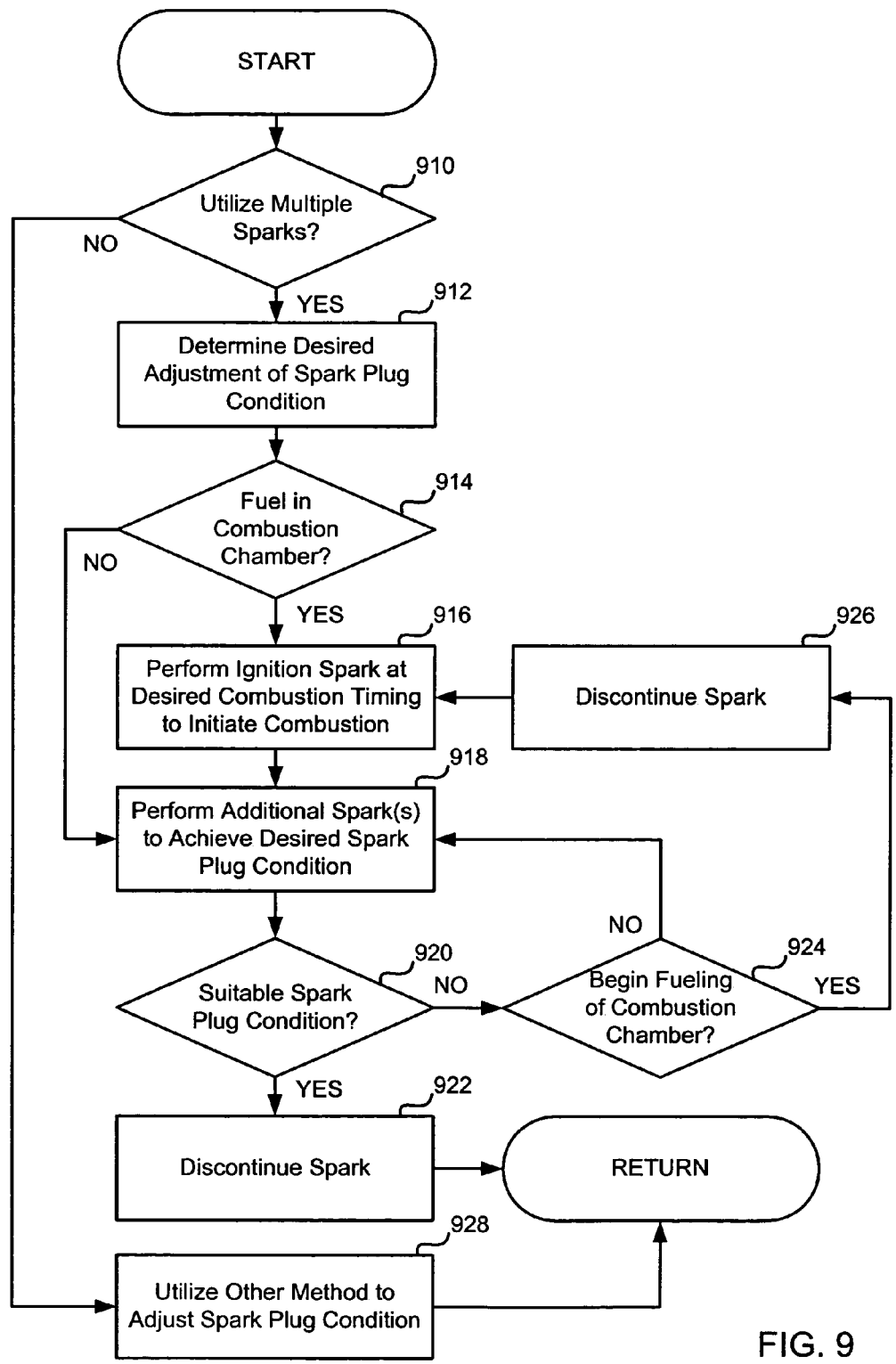

FIG. 9 shows an example routine for controlling spark plug operation. In particular, FIG. 9 shows a routine for providing multiple sparks to increase the spark plug temperature responsive to operating conditions of the engine such as temperature of the spark plug, ionization detected at the spark plug (e.g. ion sensing), a state of charge of an energy source (e.g. battery) coupled to the spark plug, and a ratio and/or absolute amount of fuel (e.g. gasoline) and fluid (e.g. water, ethanol, methanol, etc.) delivered to the combustion chamber. For example, at 910 it may be judged whether to utilize multiple sparks. If multiple sparks are not to be used, then the routine may proceed to 928, where one or more other control methods may be used to adjust the condition of the spark plug and/or combustion chamber. For example, one or more of the approaches described above may be used to increase the tip temperature of the spark plug. At 912 the desired adjustment of the spark plug condition may be determined, for example, based on a comparison of the estimated and/or inferred tip temperature and the desired tip temperature. Based on this comparison, the desired adjustment may be specified as a number of sparks, cumulative spark energy or electrical power delivered, etc. At 914 it may be judged whether fuel and/or other combustible fluid has been delivered to the combustion chamber (i.e. the combustion chamber currently contains at least one type of fuel or other combustible fluid). If the answer at 914 is yes, a first spark or ignition spark may be performed by the spark plug at 916 to initiate combustion at the desired combustion timing. Next, one or more additional sparks may be performed as determined by the control system to achieve the desired temperature increase of the spark plug at 918. Alternatively, if at 914 it is determined that fuel and/or other combustible fluid have not been delivered to the combustion chamber, then the routine may proceed to 918.

In some conditions, one or more additional sparks may be used to increase the temperature of the spark plug tip. In one example, at least one spark may be performed during the expansion stroke, the exhaust stroke, the intake stroke, and/or the compression stroke. In some conditions, the use of additional sparks could continue as long as desired until the desired temperature increase of the spark plug is achieved. For example, sparks could continue from the time of an ignition spark, through some or all of the combustion, expansion, exhaust, and intake strokes, or until fueling of the cylinder begins. The number and/or frequency and/or energy of additional sparks might also be determined from other operating conditions of the engine such as ion sensing, air/fuel ratio, the amount of fuel injected, the amount of fluid injected, the temperature of the engine, the speed of the engine, the engine load, the engine torque, the intake and/or exhaust pressures, ambient temperature, etc. However, in some conditions, the use of additional sparks may be limited or controlled responsive to a condition of the energy source (e.g. battery) or of the ignition system (e.g. measured or inferred ignition coil temperature, spark plug electrode erosion, or other durability constraints). In this manner, the trade off between energy usage, ignition system durability and undesired combustion events (e.g. preignition, knock, misfire, fouling, etc.) may be improved or optimized for the operating conditions.

At 920, it may be judged whether a sufficient spark plug condition has been attained (e.g. sufficient spark plug tip temperature, detected ionization, reduced fouling, reduced preignition, etc.) If a sufficient spark plug condition or conditions has been attained, then the sparks performed by the spark plug may be discontinued at 922 and the routine may return to 910. Alternatively, if the spark plug has not reached a desired condition, then the routine may proceed to 924. At 924 it may be judged whether fueling of the combustion chamber is to begin for the subsequent cycle. For example, in the case of direct injection or port injection at open valve injection timing, fueling may begin at initiation of fuel injection. In the case of port injection at closed valve injection timing, fueling of the cylinder may begin at intake valve opening time. If fueling of the combustion chamber is to begin, then the spark may be discontinued at 926 until a subsequent ignition spark is used to initiate combustion of the fuel and/or fluid. Alternatively, if fueling and/or induction of other combustible substance is not to begin, as for example, after initial combustion during the compression stroke, during the expansion and exhaust strokes, and/or (for direct injection) during the intake stroke and/or the early portion of the compression stroke, then the routine may return to 918, where additional sparks may be performed.

It should be appreciated that multiple sparks may be used in some conditions only when necessary, to avoid parasitic power loss and to avoid excessive erosion of spark plug electrodes, excessive ignition coil temperature, or other durability issues. However, in some conditions, it may be more desirable to reduce spark plug fouling and therefore additional sparks may be used as often or as much as possible to reduce fouling. In some embodiments, the control system may measure spark plug tip temperature, or infer it based on engine speed, load, air charge temperature, engine coolant temperature, spark advance, air/fuel ratio, engine torque, time since engine start, previous patterns of engine operating conditions, etc. The multiple spark strategy may be performed with other methods to vary spark plug temperature, such as spark plug heating, spark advance, fuel and/or fluid delivery, idle speed increase, etc. Further, the number of additional sparks and/or duration and/or energy of one or more sparks could also be controlled as a function of these or other operating conditions. The number, frequency and/or energy of additional sparks might also be limited as a function of inferred and/or measured ignition coil temperature or risk of spark plug electrode erosion or other factors related to durability of ignition components.

In some embodiments, a combustion chamber, such as combustion chamber 30 of FIG. 1, can utilize more than one spark plug. As a nonlimiting example, FIG. 10A shows a spark plug 1020a and a spark plug 1030a, both configured to provide a spark to combustion chamber 1010a. While this arrangement and other plural spark plug arrangements disclosed herein can be used with cylinder 30 of FIG. 1, it should be understood that such arrangements can also be used with different engine configurations. Furthermore, it should be understood that the various control operations described herein may be applied to some, all, or none of the spark plugs to reduce preignition, spark plug fouling, misfire, and/or engine knock.

FIG. 10A schematically shows an example combustion chamber 1010a configured with two spark plugs 1020a and 1030a located at the top of the combustion chamber. As shown in FIG. 10A, spark plug 1020a and spark plug 1030a may be arranged symmetrically about a centerline of the combustion chamber (denoted by the vertical broken line). For example, spark plugs 1020a and 1030a may be the same distance from a centerline of the combustion chamber. Thus, both spark plugs may be arranged to provide substantially equal heating of each of the spark plugs by combustion of a fuel and/or a fluid within the combustion chamber, under some conditions. However, the two spark plugs may have different levels of cooling from engine coolant (due to the amount or velocity of coolant flowing near each spark plug, or distance of each spark plug from the nearest coolant passage, etc.).

FIG. 10B schematically shows an example combustion chamber 1010b configured with two spark plugs 1020b and 1030b located at the top of the combustion chamber. As shown in FIG. 10B, spark plug 1020b and 1030b may be arranged asymmetrically about the centerline of the combustion chamber. For example, spark plug 1020b may be closer to the centerline of the combustion chamber and spark plug

1030b may be further from the centerline, thereby potentially providing unequal heating of each of the spark plugs by combustion of a fuel and/or fluid within the combustion chamber, under some conditions. In addition, the two spark plugs may have different levels of cooling from engine coolant.

FIG. 10C schematically shows an example combustion chamber 1010c configured with two spark plugs 1020c and 1030c. Spark plug 1020c is shown located at the top of the combustion chamber, while spark plug 1030c is shown located along a side wall of the combustion chamber. Thus, the spark plugs may be arranged on different surfaces or walls of the combustion chamber, thereby potentially providing unequal heating of each of the spark plugs by combustion, under some conditions. In addition, the two spark plugs may have different levels of cooling from engine coolant.

FIG. 10D schematically shows an example combustion chamber 1010d configured with two spark plugs 1020d and 1030d. In this example, both spark plugs are located along a side wall of the combustion chamber. In some embodiments, both spark plugs may be arranged symmetrically about the centerline of the combustion chamber, and/or may be arranged equal distant from a center line of the combustion chamber. As shown in FIG. 10D, the spark plugs are asymmetrically arranged about the centerline, at a different height of the combustion chamber wall, thereby providing potentially unequal heating of the spark plugs. In addition, the two spark plugs may have different levels of cooling from engine coolant.

As described above with reference to FIGS. 10A-10D, some combustion chambers may include at least two spark plugs. These spark plugs may have the same or different heat ranges. For example, in each of the examples provided above, a first spark plug may have the same heat range as a second spark plug located in the same combustion chamber. Thus, each of the spark plugs within the same cylinder may be configured to operate at the same temperature or may be configured to operate at different temperatures (e.g. different tip temperatures), at a particular time, by arranging them in different locations (e.g. asymmetrically) with the combustion chamber, and/or by exposing them to different levels of cooling from engine coolant.

In some embodiments, a first spark plug may have a different heat range than a second spark plug located in the same combustion chamber, thereby enabling the first spark plug to operate at a different temperature than the second spark plug. Furthermore, in some embodiments, a first spark plug having a higher heat range and a second spark plug having a lower heat range may be located at different locations within the combustion chamber, depending at least partially on the thermal characteristics of the combustion chamber and/or engine cooling system. For example, the first spark plug with the higher heat range may be located in a lower temperature location of the combustion chamber and the second spark plug with the lower heat range may be located in a higher temperature location of the combustion chamber. In another example, the first spark plug with the higher heat range may be located in a higher temperature location of the combustion chamber and the second spark plug with the lower heat range may be located in a lower temperature location of the combustion chamber. In this manner, at least a first spark plug and a second spark plug located within the same combustion chamber may be configured to operate at different spark plug tip temperatures by arranging the spark plugs in particular locations and/or by selecting different heat ranges for each of the spark plugs.

Figure 11:
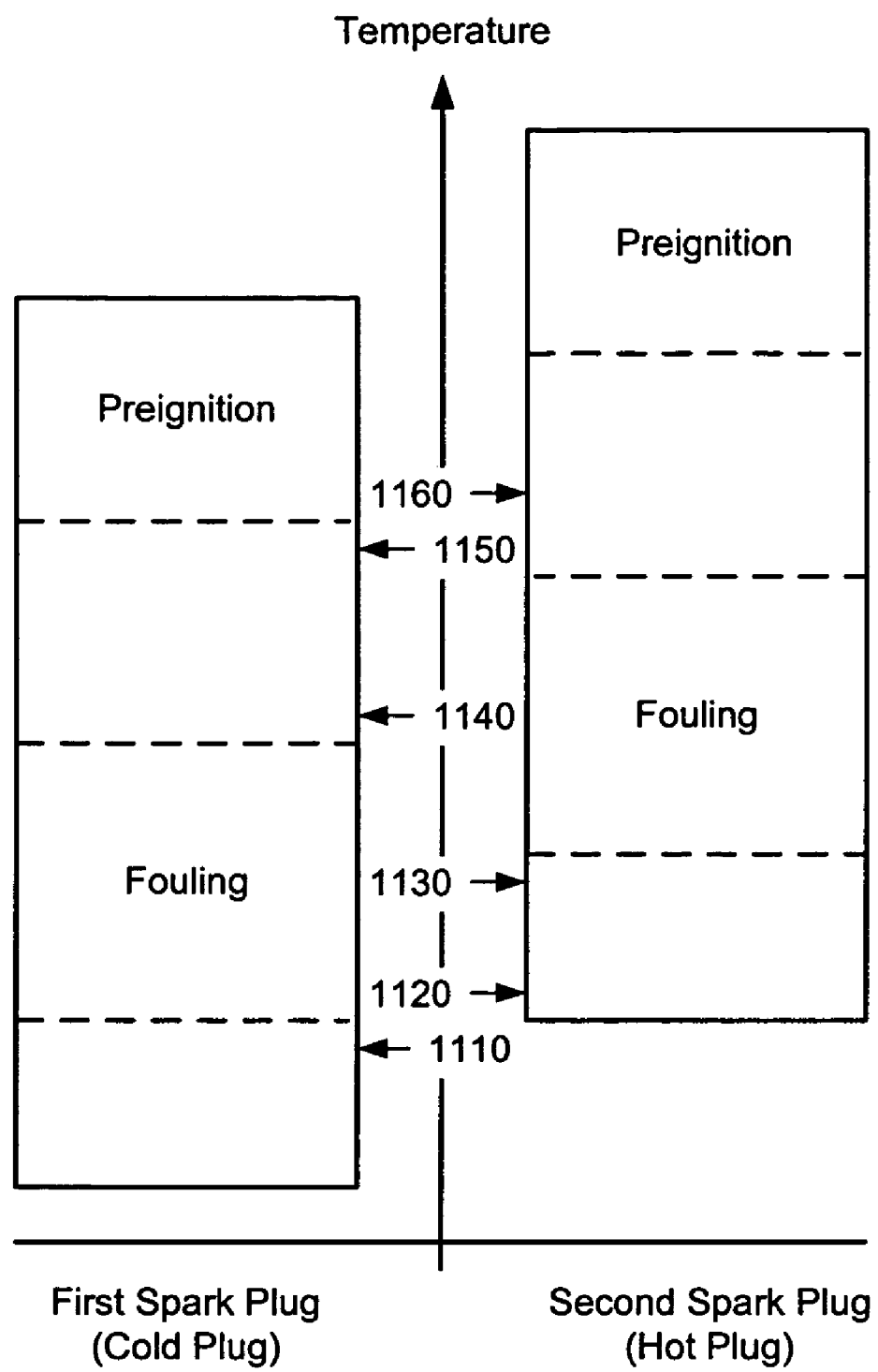
FIG. 11 is a graph comparing various temperature ranges for a first and a second spark plug.

FIG. 11 shows a graph of temperature operating regions for a first and a second spark plug having different locations within the same combustion chamber and/or having different heat ranges. The center vertical axis of FIG. 11 represents temperature of a single point within the combustion chamber, which may be compared to the operating regions of each of the spark plugs. On either side of the temperature axis are several operating regions as described above with reference to FIG. 3B. The left side of the temperature axis contains several operating regions for a first example spark plug and the right side of the temperature axis contains several operating regions for a second example spark plug. The first spark plug (denoted as the cold plug) is configured to operate at a lower temperature and the second spark plug (denoted as the hot plug) is configured to operate at a higher temperature than the first spark plug.

In some embodiments, the control system may be configured to selectively operate (i.e. perform at least one spark with) at least one of the two spark plugs to achieve combustion of a fuel and/or a fluid within the combustion chamber. For example, during a first operating condition 1110, the control system may be configured to operate the first spark plug, since the tip temperature of the first spark plug is below the fouling range. As described above, the operating range of the spark plugs may be assessed or determined by detecting ionization at the spark plugs or by detecting the temperature of the spark plug, engine temperature, exhaust temperature, etc. As the operating conditions of the engine change to a second condition 1120, the second spark plug may be used as the tip temperature of the first spark plug may be within the fouling range wherein the deposited carbon is more conductive. At a third condition 1130, the tip temperature of the second spark plug is still below the fouling range while the tip temperature of the first spark plug is within the fouling range, hence the second spark plug may be operated to avoid misfire caused by spark plug fouling.

During some conditions, such as between conditions 1130 and 1140, the fouling ranges of the first and second spark plugs may partially overlap. Therefore, to reduce spark plug fouling, the control system may be configured to rapidly transition between conditions 1130 and 1140 by varying spark timing, adjusting the absolute amount and/or ratio of fuel and/or fluid delivered to the combustion chamber, adjusting spark plug heating of one or both of the spark plugs, adjusting the number of sparks performed by each spark plug (i.e. use more sparking to increase spark temperature), increasing idle speed, etc.

For example, before and/or during a transition from condition 1130 to 1140, the amount of heat supplied to the second spark plug may be increased so that the overlap of the fouling ranges of the first and second spark plugs are reduced. An increase in heating supplied to the second spark plug may cause the operating range of the second spark plug in FIG. 11 to move upward relative to the operating range of the first spark plug, closing the distance between conditions 1130 and 1140. Upon reaching condition 1140, the control system may transition to the first spark plug, while discontinuing the sparking operation of the second spark plug. Once the first spark plug begins initiating combustion within the combustion chamber, the heat supplied to the second spark plug by the spark plug heating system may be reduced, if desired.

In another example, before and/or during a transition from condition 1130 to 1140, the number of sparks performed by the second spark plug may be increased for each cycle, which may also be used to increase the temperature of the second spark plug, thereby reducing the fouling range overlap between the first and the second spark plugs. In this manner, independent temperature control of the spark plugs may be achieved.

In some examples, some overlap in the fouling ranges of the first and second spark plugs may not be avoided, even when some or all of the control strategies are applied. During this condition, the first and the second spark plugs may be operated to perform a spark simultaneously or one after the other to ensure ignition of the fuel and/or fluid within the combustion chamber. For example, during a transition from condition 1130 to 1140, the second spark plug may be controlled to perform a first spark and the first spark plug may be controlled to perform a back-up spark either at the same time, before, or after the first spark. Once a condition is attained where at least one of the spark plugs is outside of the fouling range, the spark plug outside of the fouling range may be operated and the other spark plug discontinued. For example, upon reaching condition 1140, operation of the first spark plug may be continued and operation of the second spark plug may be discontinued.

Conversely, when transitioning from condition 1140 where the first spark plug is performing a spark to condition 1130 where the second spark plug is performing a spark, the control system may use one or more strategies to reduce spark plug fouling. For example, the control system may pre-heat the second spark plug by increasing the heat supplied to the second spark plug by the spark plug heating system and/or by using multiple sparks after an ignition spark is performed by the first spark plug. In some conditions, the second spark plug may be fouled, wherein one or more sparks may not be possible. Thus, the ignition spark may be provided by the first spark plug at condition 1140 and the second spark plug may be heated to a temperature above the fouling range where the deposited carbon is burned off. Once the second spark plug is capable of performing a spark, the first spark plug and the second spark plug may be controlled so that each spark plug performs a spark when transitioning to condition 1130 through a fouling range of one or more of the spark plugs. The use of concurrent sparking by both spark plugs may be used in some conditions to reduce misfire or to reduce spark plug fouling.

Turning now to condition 1150, the first spark plug may be operated to perform a spark while the sparking operation of the second spark plug may be discontinued. Transitions from condition 1150 to condition 1160 may be performed by phasing out operation of the first spark plug over one or more engine cycles as the second spark plug is used. However, during some conditions, such as condition 1160, even when only the second spark plug is operated to perform a spark and the first spark plug is discontinued, preignition may occur if the tip temperature of the first spark plug is within the preignition temperature range. Therefore, during some conditions, such as at condition 1150, the first spark plug may be discontinued for one or more cycles prior to a temperature increase, for example, into a preignition region, while the second spark plug is performing an ignition spark. In this manner, the first spark plug may be allowed to cool over one or more cycles to further reduce the occurrence of preignition during subsequent cycles.

It should be understood that some or all of the control strategies described above may be applied to only one, some, or all of the spark plugs. In some embodiments, only one of the spark plugs may be configured with a spark plug heating system or only one of the spark plugs may be configured to perform multiple sparks during a cycle. Furthermore, it should be appreciated that some or all of the spark plug configurations described above may be used to achieve different tip temperatures between the first spark plug and the second spark plug. For example, both spark plugs may have the same heat range, but may be arranged differently within the combustion chamber and may be exposed to the same or different levels of cooling from engine coolant. In another example, both spark plugs may be arranged symmetrically within the combustion chamber, but may have different heat ranges and may be exposed to the same or different levels of cooling from engine coolant. In yet another example, both spark plugs may be arranged differently within the combustion chamber and both spark plugs may have a different heat range from the other chamber and may be exposed to the same or different levels of cooling from engine coolant. In some embodiments, more than two spark plugs per combustion chamber may be used.

Figure 12:
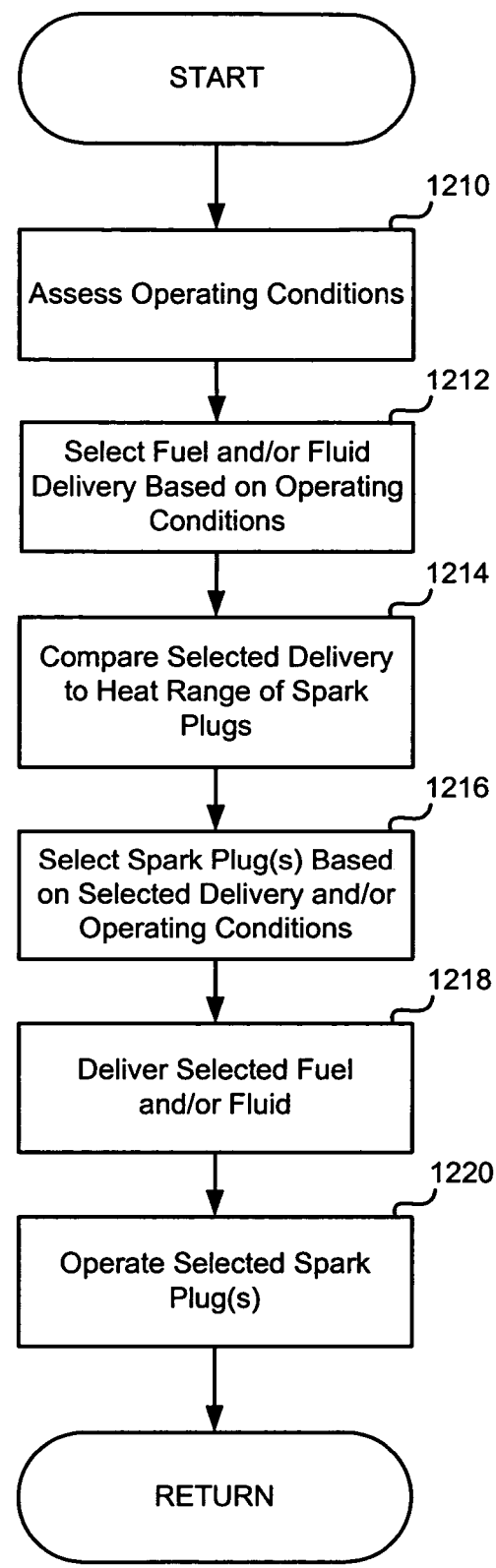
FIGS. 12 and 13 show example engine control routines.
Figure 13:
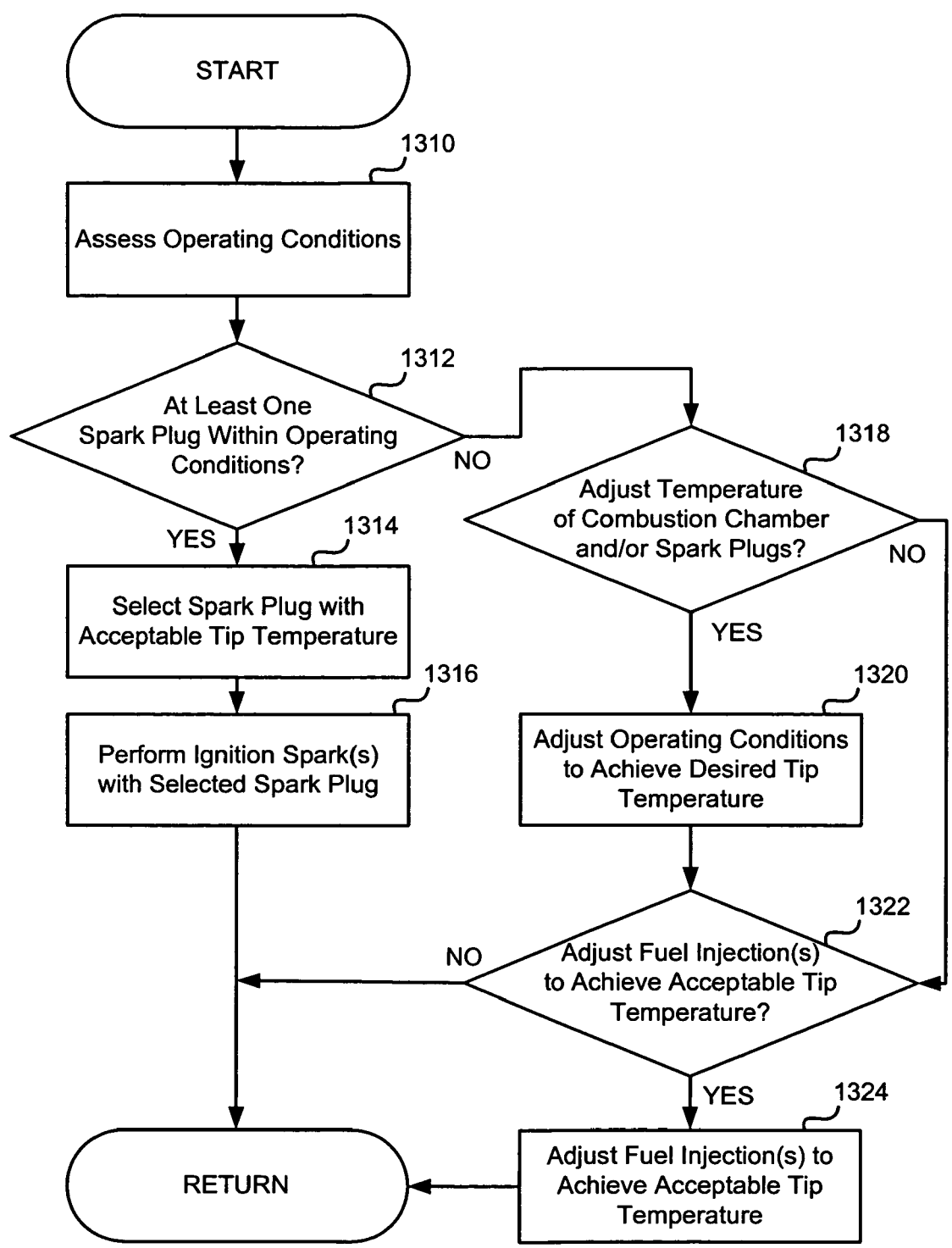

FIGS. 12-13 show example routines for controlling an engine having a combustion chamber configured with at least two spark plugs. The routine of FIG. 12 may begin with the control system assessing the operating conditions of the engine and/or vehicle at 1210. In some embodiments, the control system will examine past, present, and predicted future operating conditions. In some embodiments, ion sensing may be performed by one, some or all of the spark plugs. At 1212, the control system may select a fuel and/or a fluid delivery based on the operating conditions. For example, if knock is detected, a knock suppressing fluid such as ethanol, methanol, and/or water may be selected for delivery to the combustion chamber. The operation of 1212 may include selecting an absolute amount of fuel and/or fluid, a ratio of the fuel and/or the fluid, and timing of injection of the fuel and/or fluid. At 1214, the control system may compare the selected fuel and/or fluid delivery to the heat range and/or temperature conditions of the spark plugs. For example, ion sensing, temperature sensing, and/or temperature prediction may be used to determine whether fouling or preignition may occur for the selected fuel and/or fluid(s). At 1216, one or more spark plugs may be selected based on the selected fuel and/or fluid delivery and/or the operating conditions. At 1218, the control system may delivery the fuel and/or fluid, for example, by a direct and/or port injection. At 1220, the control system may operate the selected spark plug(s) to initiated combustion of the fuel and/or fluid.

In some conditions, a first spark may be performed by a first spark plug. The ionization at the spark plug may be detected enabling a determination of whether combustion has occurred. If combustion has not occurred such as may be the case if the spark plug is fouled, the control system may be configured to perform one or more additional sparks with the first spark plug and/or perform one or more additional sparks with the second spark plug to initiate combustion. In some examples, one or more of the spark plugs may perform multiple sparks to achieve a temperature increase of the spark plug(s). Finally, the routine returns to 1210 for the subsequent cycle.

In this manner, during some conditions only the first spark plug may be used, during some conditions only the second spark plug may be used, and during other conditions both the first and the second spark plug may be used. It should be appreciated that the life cycle of a spark plug configured in a combustion chamber with at least one other spark plug may be extended, under some conditions, since the sparking operation may be shared between spark plugs.

FIG. 13 shows a routine for selecting at least one spark plug from a plurality of spark plugs of the combustion chamber. At 1310, the control system assesses the operating conditions of the engine and/or vehicle. At 1312, it is judged whether at least one spark plug is within a satisfactory operating condition. For example, it may be judged at 1312 whether the tip temperature of at least one of the spark plugs is outside of the fouling or preignition range. In another example, it may be assessed via ion sensing whether preignition or fouling occurred during the previous cycle due to one or more of the spark plugs. If the answer at 1312 is yes, the control system may select at least one of the spark plugs with the satisfactory operation condition. At 1316, the selected spark plug(s) may be operated to perform an ignition spark and/or additional sparks.

Alternatively, if the answer at 1312 is no, the routine may proceed to 1318. At 1318, the control system may judge whether to adjust one or more conditions of the combustion chamber and/or spark plugs. If the answer is no, the routine may proceed to 1322. If the answer is yes, the control system may adjust one or more operating conditions to achieve the desired spark plug condition. For example, one or more of the control strategies described above with reference to FIGS. 6-9 may be used to increase or decrease the temperature of one or more spark plugs. At 1322, it may be judged whether to adjust at least one of the fuel and/or fluid to be delivered to the combustion chamber. If the answer is no, the routine returns to 1310. Alternatively, if the answer at 1322 is yes, the control system may adjust the fuel and/or fluid delivery to achieve acceptable spark plug conditions. For example, if preignition is detected, then the amount of ethanol delivered to the combustion chamber may be decreased for one or more subsequent cycles. Finally, the routine returns to 1310 for the subsequent cycle. In this manner, the condition of the spark plugs (e.g. tip temperature) may be adjusted to avoid and/or reduce preignition, spark plug fouling, misfire, and engine knock.

Figure 14A:
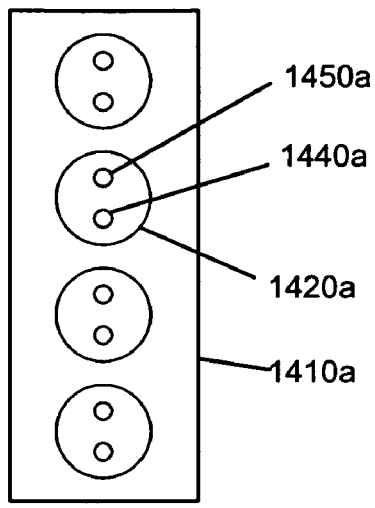
FIGS. 14A-14D show several schematic diagrams of example engine configurations.

An engine such as engine 10 of FIG. 1 may include a variety of configurations. For example, FIG. 14 shows several nonlimiting examples of an engine that may include one or more combustion chambers configured with two spark plugs. It should be understood that engines 1410a, 1410b, 1410c, and 1410d may be configured to perform one or more of the control strategies described above for reducing knock, preignition, misfire, and fouling and may include the use of one or more fuels and/or fluids. For example, FIG. 14A shows an example inline four cylinder engine 1410a, wherein each combustion chamber 1420a includes spark plugs 1440a and 1450a. In some embodiments, each of the four combustion chambers of engine 1410a may be similarly configured (e.g. having a similar spark plug arrangement and/or spark plugs with similar heat ranges). In some embodiments, one or more of the four combustion chambers of engine 1410a may have a pair of spark plugs having different heat ranges and/or combustion chamber arrangements. For example, a first combustion chamber may utilize a first spark plug arrangement as shown in FIGS. 10A, 10B, 10C, or 10D, while a second combustion chamber may have a different spark plug arrangement, even though all of the combustion chambers shown each have two spark plugs. In another example, each combustion chamber may have similar spark plug arrangements, wherein at least one of the spark plugs of a first combustion chamber has a different heat range than each of the spark plugs in a second combustion chamber. In this manner, spark plug configuration and/or heat range may be varied with the position of the combustion chamber within the engine.

Figure 14B:
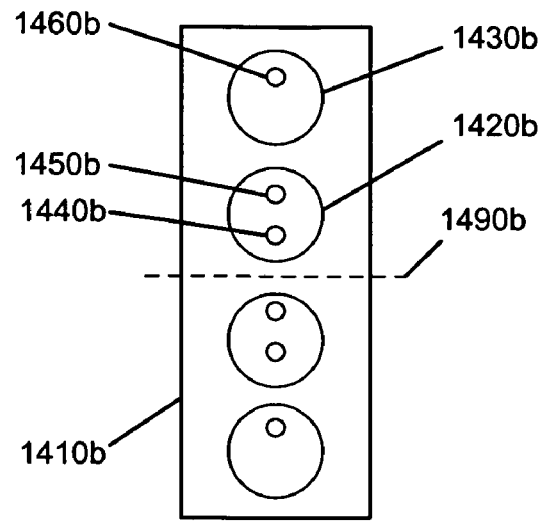

FIG. 14B shows engine 1410b also having an inline four cylinder configuration. Combustion chamber 1420b is shown having two spark plugs 1440b and 1450b, while combustion chamber 1430b is shown having only one spark plug 1460b. Furthermore, a center line 1490b is shown bisecting engine 1410b between the center two combustion chambers. As shown in FIG. 14B, at a least first combustion chamber having two spark plugs and a second combustion chamber having only one spark plug may be arranged differently, for example, at different distances from centerline 1490b. In some examples, temperature variations within the engine, such as between combustion chambers may be considered when arranging the spark plugs within the engine. For example, combustion chamber 1420b having two spark plugs may be arranged closer to the center of the engine, while combustion chamber 1430b having only one spark plug may be arranged further from the center of the engine.

In some embodiments, only some cylinders of the engine may be configured to receive multiple fuels and/or fluids. For example, combustion chamber 1420b having two spark plugs may be configured to receive gasoline and ethanol in different ratios, whereas combustion chamber 1430b may be configured to receive only gasoline.

Figure 14C:
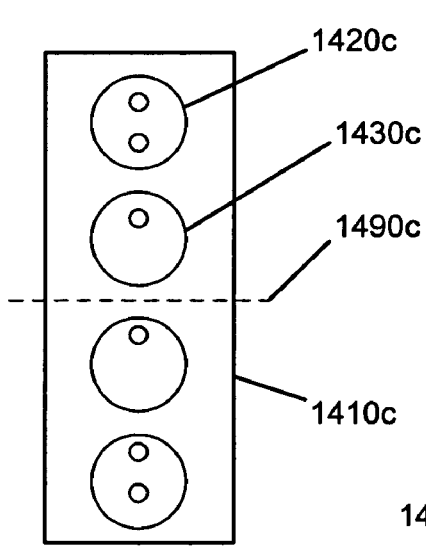

FIG. 14C is similar to FIG. 14B, except combustion chamber 1420c is shown having two spark plugs located further from centerline 1490c than combustion chamber 1430c having only one spark plug. While FIGS. 14A, 14B and 14C show engines that are symmetric about a centerline, other cylinder configurations are possible.

Figure 14D:
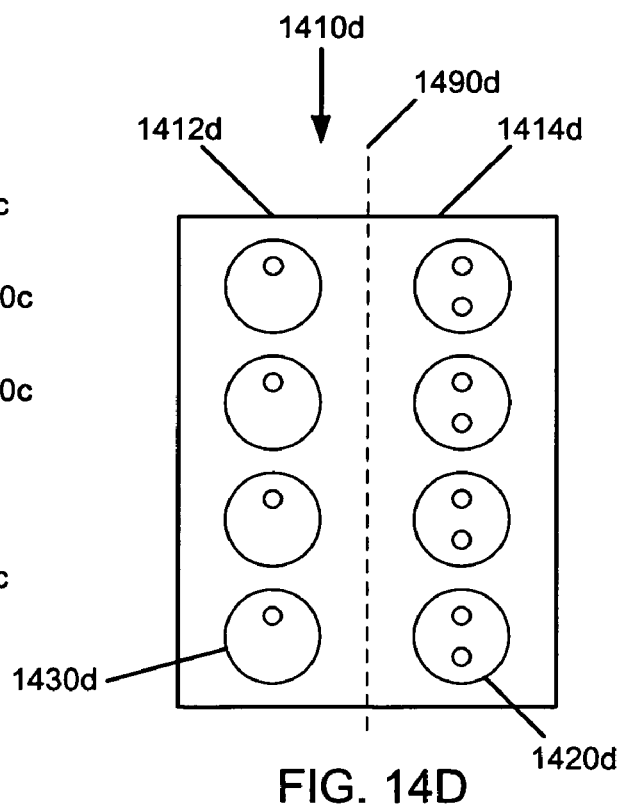

In another example, FIG. 14D shows an engine 1410d having a first bank of cylinders 1412d and a second bank of cylinders 1414d is shown including a plurality of combustion chambers 1430d, each having only one spark plug. Bank 1414d is shown including a plurality of combustion chambers 1420d, each having two spark plugs. A centerline 1490d is shown bisecting the engine between bank 1412d and 1414d. Such asymmetry of engine 1410d may be used to address varied operation of the engine between cylinder banks.

For example, in some embodiments, a group of cylinders may be configured to receive multiple fuels and/or fluids, while a second group of cylinders may be configured to receive only one type of fuel or fluid. For example, cylinder bank 1414d may be configured to receive gasoline and ethanol, while bank 1412d may be configured to receive only gasoline. In some embodiments, one bank of engine 1410d may be configured deactivate one or more cylinders during some conditions, while operation of the other cylinder bank continues or two cylinders from each bank may be deactivated, and spark plugs and injectors for fuel and/or other substances arranged accordingly. In this manner, an engine may have various spark plug and cylinder configurations depending on the desired engine operation.

It will be appreciated that the configurations, systems, and routines disclosed herein are exemplary in nature, and that these specific embodiments are not to be considered in a limiting sense, because numerous variations are possible. For example, the above approaches can be applied to V-6, I-3, I-4, I-5, I-6, V-8, V-10, V-12, opposed 4, and other engine types.

As another example, engine 10 may be a variable displacement engine in which some cylinders are deactivated by deactivating intake and exhaust valves for those cylinders and/or discontinuing fuel injection to those cylinders. In this way, improved fuel economy may be achieved. Multiple types of fuel delivery (e.g., fuel and/or fluid composition, delivery location, and/or delivery timing) can be used to reduce a tendency of knock at higher loads. Thus, by operating with direct injection of a fluid including alcohol (such as ethanol or an ethanol blend) to some active cylinders during a cylinder deactivation operation, it may be possible to extend a range of cylinder deactivation, thereby further improving fuel economy.

The specific routines described herein by the flowcharts and the specification may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one or more of the illustrated steps or functions may be repeatedly performed depending on the particular strategy being used. Further, these figures may graphically represent code to be programmed into the computer readable storage medium of the vehicle control system. Further still, while the various routines may show a "start", "return" or "end" block, the routines may be repeatedly performed in an iterative manner, for example.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
   a combustion chamber;
   a first spark plug configured to perform a spark within the combustion chamber, said first plug configured to have a first heat range;
   a second spark plug configured to produce a spark within the combustion chamber, said second plug configured to have a second heat range different from said first heat range of said first plug; and
   a delivery system configured to deliver a hydrocarbon fuel and a fluid including an alcohol to the combustion chamber in varying resulting ratios.

2. The engine system of claim 1, wherein the first spark plug has a first ceramic portion and the second spark plug has a second ceramic portion, said second ceramic portion having a different size than said first ceramic portion.

3. The engine system of claim 1, wherein the first spark plug is configured to transfer heat at a different rate than the second spark plug.

4. The engine system of claim 1, wherein the first spark plug has a different shape than the second spark plug and wherein the combustion chamber is configured to receive the first and the second spark plug.

5. The engine system of claim 1, wherein the first spark plug has a different size than the second spark plug and wherein the combustion chamber is configured to receive the first and the second spark plug.

6. The engine system of claim 5, wherein the first spark plug projects further into the combustion chamber than the second spark plug.

7. The engine system of claim 1, wherein at least an insulating portion of the first spark plug comprises a different material than an insulating portion of the second spark plug.

8. The engine system of claim 1, further comprising a control system configured to
   during a first condition, initiate combustion within the combustion chamber via only the first spark plug; and
   during a second condition, initiate combustion within the combustion chamber via only the second spark plug.

9. The engine system of claim 1, wherein the control system is configured to during a third condition, operate the first spark plug to perform at least one spark and operate the second spark plug to perform at least one spark during a cycle of the combustion chamber.

10. An engine system, comprising:
    a combustion chamber configured to receive a first spark plug and a second spark plug;
    a first spark plug configured to perform a spark within the combustion chamber, said first plug at a first location in the combustion chamber;
    a second spark plug configured to produce a spark within the combustion chamber; said second plug at a second location in the combustion chamber having a greater heat transfer than the first spark plug located at the first location; and
    a delivery system configured to deliver a hydrocarbon fuel and a fluid including alcohol to the combustion chamber in varying resulting ratios.

11. The engine system of claim 10, further comprising a control system configured to
    during a first condition, initiate combustion via only the first spark plug; and
    during a second condition, initiate combustion via only the second spark plug.

12. The engine system of claim 10, wherein the first spark plug is configured for a first heat range and the second spark plug is configured for a second heat range, wherein the first heat range and the second heat range are substantially similar.

13. The engine system of claim 10, wherein the first spark plug is configured for a first heat range and the second spark plug is configured for a second heat range, wherein the first heat range is different than the second heat range.

14. The engine system of claim 10, wherein the first location and the second location are asymmetrically arranged about a centerline of the combustion chamber.

15. The engine system of claim 10, wherein the combustion chamber is configured such that the tip of the first spark plug is at a higher temperature than the tip of the second spark plug.

16. The engine system of claim 10, wherein the combustion chamber includes a coolant system configured to transfer heat from at least one of the first and the second spark plugs, wherein the coolant system is configured to transfer more heat from the first spark plug than the second spark plug so that the first spark plug is at a lower temperature during a condition of the combustion chamber.

17. An engine system, comprising:
    a combustion chamber;
    a first spark plug configured to perform a spark within the combustion chamber, said first plug configured to have a first heat range;
    a second spark plug configured to produce a spark within the combustion chamber; said second plug configured to have a second heat range different from said first heat range of said first plug, so that under an operating condition, the first spark plug is at a higher temperature than the second spark plug;

a delivery system configured to deliver a hydrocarbon fuel and a fluid including alcohol to the combustion chamber in varying ratios.

18. The engine system of claim 17, further comprising a control system configured to control the delivery of the hydrocarbon fuel and the fluid responsive to an indication of knock.

19. The engine system of claim 18, wherein the control system is configured to use only the first spark plug during a first ratio of the fuel and the fluid and only the second spark plug during a second ratio of the fuel and the fluid.

20. The engine system of claim 18, wherein at least one of the first spark plug and the second spark plug are used by the control system to detect at least one of preignition within the combustion chamber, spark plug fouling, misfire and knock.

* * * * *